US012611814B2

(12) United States Patent
Li et al.

(10) Patent No.: US 12,611,814 B2
(45) Date of Patent: Apr. 28, 2026

(54) ACOUSTIC LEVITATION-ASSISTED CONTACTLESS DROPLET PRINTING

(71) Applicants: Xiangjia Li, Chandler, AZ (US); Tengteng Tang, Tempe, AZ (US)

(72) Inventors: Xiangjia Li, Chandler, AZ (US); Tengteng Tang, Tempe, AZ (US)

(73) Assignee: Arizona Board of Regents on behalf of Arizona State Univeristy, Scottsdale, AZ (US)

( * ) Notice: Subject to any disclaimer, the term of this patent is extended or adjusted under 35 U.S.C. 154(b) by 99 days.

(21) Appl. No.: 18/620,394

(22) Filed: Mar. 28, 2024

(65) Prior Publication Data

US 2024/0326322 A1 Oct. 3, 2024

Related U.S. Application Data

(60) Provisional application No. 63/493,849, filed on Apr. 3, 2023.

(51) Int. Cl.
| | |
|---|---|
| *B29C 64/112* | (2017.01) |
| *A61J 3/00* | (2006.01) |
| *B29K 71/00* | (2006.01) |
| *B33Y 10/00* | (2015.01) |
| *B33Y 70/00* | (2020.01) |
| *B33Y 80/00* | (2015.01) |

(52) U.S. Cl.
CPC .............. *B29C 64/112* (2017.08); *A61J 3/00* (2013.01); *B33Y 10/00* (2014.12); *B33Y 70/00* (2014.12); *B33Y 80/00* (2014.12); *B29K 2071/02* (2013.01)

(58) Field of Classification Search
CPC .......... B29C 64/112; A61J 3/00; B33Y 10/00; B33Y 70/00; B33Y 80/00; B33Y 30/00; B29K 2071/02
See application file for complete search history.

(56) References Cited

U.S. PATENT DOCUMENTS

| | | | | |
|---|---|---|---|---|
| 5,678,553 | A * | 10/1997 | Uhlendorf | A61B 8/481 |
| | | | | 600/458 |
| 9,878,536 | B2 * | 1/2018 | Foresti | B41J 2/14008 |
| 10,583,613 | B2 * | 3/2020 | Bharti | G05B 19/4097 |
| 11,897,263 | B2 * | 2/2024 | Foresti | B29C 64/112 |
| 2011/0020236 | A1 * | 1/2011 | Bohmer | B01J 13/125 |
| | | | | 424/9.4 |

(Continued)

OTHER PUBLICATIONS

Zou, D., et al., "Artificial cells for the treatment of liver diseases," Acta Biomaterialia. vol. 130. p. 98-114. Aug. 2021. https://doi.org/10.1016/j.actbio.2021.06.012.

(Continued)

*Primary Examiner* — Nahida Sultana
(74) *Attorney, Agent, or Firm* — Snell & Wilmer L.L.P.

(57) ABSTRACT

A method for universal contactless printing comprises depositing a first droplet into a sound field, curing the droplet to form a cured droplet, depositing a second droplet, and securing the second droplet to previously cured droplet by curing the second droplet. The method of contactless printing can be repeated to form a complex three-dimensional structure. The first droplet that is deposited can be secured to a moveable structure by curing the first droplet to the moveable structure. The moveable structure can be moved to place a next droplet to be deposited and cured.

19 Claims, 24 Drawing Sheets

1400

(56) References Cited

U.S. PATENT DOCUMENTS

| | | | | |
|---|---|---|---|---|
| 2012/0164907 A1* | 6/2012 | Restuccia | .............. | B32B 5/022 |
| | | | | 442/381 |
| 2017/0348903 A1* | 12/2017 | Renn | ...................... | B33Y 80/00 |
| 2019/0144813 A1* | 5/2019 | Lipkens | .............. | C12N 5/0068 |
| | | | | 435/378 |
| 2020/0290392 A1* | 9/2020 | Rhee | .................... | B29C 64/321 |

OTHER PUBLICATIONS

Marzo, A., et al., "TinyLev: A multi-emitter single-axis acoustic levitator," Review of Scientific Instruments. Aug. 2017, 88(8), p. 085105. https://doi.org/10.1063/1.4989995.

Watanabe, A., et al., "Contactless Fluid Manipulation in Air: Droplet Coalescence and Active Mixing by Acoustic Levitation," Scientific Reports. Jul. 2018, 8(1), p. 10221.DOI:10.1038/s41598-018-28451-5.

Polychronopoulos, S., et al., "Acoustic levitation with optimized reflective metamaterials," Scientific Reports. Mar. 2020, 10(1), p. 4254.

Hirayama, R., et al., "High-speed acoustic holography with arbitrary scattering objects," Science Advances, vol. 8. Jun. 2022. 8, Downloaded from https://www.science.org on Aug. 19, 2024.

Marzo, A., et al., "Holographic acoustic elements for manipulation of levitated objects," Nature Communications. Oct. 2015, vol. 6(1), p. 8661.

Ochiai, Y., et al., "Three-Dimensional Mid-Air Acoustic Manipulation by Ultrasonic Phased Arrays," Plos One. May 2014, 9(5), p. e97590. https://doi.org/10.1371/journal.pone.0097590.

Morales, R., et al., "Generating Airborne Ultrasonic Amplitude Patterns Using an Open Hardware Phased Array," Applied Sciences. Mar. 2021. vol. 11(7) 2981. https://doi.org/10.3390/app11072981.

Foresti, D., et al., "Acoustophoretic contactless transport and handling of matter in air," Proceedings of the National Academy of Sciences. Jul. 2013, vol. 110(31), pp. 12549-12554. https://doi.org/10.1073/pnas.1301860110.

Chen, K., et al., "Rapid formation of size-controllable multicellular spheroids via 3D acoustic tweezers," Lab on a Chip. 2016, vol. 16(14), pp. 2636-2643. DOI https://doi.org/10.1039/C6LC00444J.

Tanwar, L., et al., "Engineering materials for artificial cells," Current Opinion in Solid State and Materials Science. Aug. 2022, vol. 26(4), p. 101004. https://doi.org/10.1016/j.cossms.2022.101004.

Chen, L., et al., "Emulsion Designer Using Microfluidic Three-Dimensional Droplet Printing in Droplet," Nano. Micro. Small. Aug. 2021, 17(39), p. 2102579. https://doi.org/10.1002/smll.202102579.

Li, J., et al., "Building programmable multicompartment artificial cells incorporating remotely activated protein channels using microfluidics and acoustic levitation," Nature Communications. Jul. 2022, vol. 13(1), p. 4125.

Zang, D., et al., "Acoustic levitation of liquid drops: Dynamics, manipulation and phase transitions, " Advances in Colloid and Interface Science. May 2017, vol. 243, pp. 77-85. https://doi.org/10.1016/j.cis.2017.03.003.

Tang, T., et al., "Scalable Multi-Material Additive Manufacturing of Bioinspired Polymeric Material With Metallic Structures Via Electrically Assisted Stereolithography," Journal of Manufacturing Science and Engineering. Oct. 2022, vol. 145(1). https://doi.org/10.1115/1.4055793.

Tang, T., et al., "4D Printing of Seed Capsule-Inspired Hygro-Responsive Structures via Liquid Crystal Templating-Assisted Vat Photopolymerization," Advanced Functional Materials. Nov. 2022, p. 2211602. https://doi.org/10.1002/adfm.202211602.

Joralmon, D., et al., "Three-Dimensional Printing of Liquid Crystals with Thermal Sensing Capability via Multimaterial Vat Photopolymerization," ACS Applied Polymer Materials. Apr. 2022, vol. 4(4), pp. 2951-2959. 10.1021/acsapm.2c00322.

Sakamoto, R., et al., "Geometric trade-off between contractile force and viscous drag determines the actomyosin-based motility of a cell-sized droplet," Proceedings of the National Academy of Sciences. Jul. 2022, vol. 119(30), p. e2121147119. https://doi.org/10.1073/pnas.2121147119.

Zhu, Y., et al., "Recent advancements and applications in 3D printing of functional optics," Additive Manufacturing. Apr. 2022, vol. 52, p. 102682. https://doi.org/10.1016/j.addma.2022.102.

Shen, C. L., et al., "Parametrically excited sectorial oscillation of liquid drops floating in ultrasound," Physical Review E. Apr. 2010, vol. 81(4), p. 046305. https://doi.org/10.1103/PhysRevE.81.046305.

Joyee, E. B., et al., "Analysis of mechanical behavior of 3D printed heterogeneous particle-polymer composites," Composites Part B: Engineering. Sep. 2019, vol. 173, p. 106840. https://doi.org/10.1016/j.compositesb.2019.05.051.

Yasui, M., et al., "Modeling and measurement of curing properties of photocurable polymer containing magnetic particles and microcapsules," Microsystems & Nanoengineering. Aug. 2017, vol. 3(1), p. 17035.

* cited by examiner

100

3 NODES 10 Hz

4 NODES 230 Hz

5 NODES 340 Hz

6 NODES 450 Hz

7 NODES 780 Hz

8 NODES 890 Hz

LIQUID CELL UNDER HIGH
ACOUSTIC PRESSURE

LIQUID CELL UNDER LOW
ACOUSTIC PRESSURE

Inject First Material

Inject Second Material
Inside First Material

Inject Third Material
Inside Second Material

Inject Fourth Material
Inside Third Material

5mm

UV LIGHT

BLUE

BLUE

RED

BLUE

DROPLET

UV LIGHT

ULTRASONIC TRANSDUCER

1202

Depositing an initial drop of material into a sound field

1204

Curing the initial drop of material via a curing step

1206

Securing the initial drop of material to a building platform

1208

Repeating a deposition cycle until the three-dimensional printed structure is formed

1300

1302

| Moving a building platform |
|---|

1304

| Depositing a subsequent drop of material into the sound field |
|---|

1306

| Curing the subsequent drop of material via the curing step |
|---|

1308

| Securing the subsequent drop of material to a previously cured drop of material in response to the curing the subsequent drop of material |
|---|

1400

1402

| Suspending a droplet in a sound field |

1404

| Injecting a biocompatible solution to surround the droplet |

1406

| Curing the biocompatible solution to enclose the droplet within a cured shell and form a structure |

1500

1502

| Suspending a biocompatible solution in a sound field |
| --- |

1504

| Injecting a droplet into an interior of the biocompatible solution |
| --- |

1506

| Curing the biocompatible solution to enclose the droplet within a cured shell and form a product |
| --- |

1602

Extruding a first drop of material into a sound field

1604

Extruding a second drop of material into an interior of the first drop of material

1606

Extruding a fourth drop of material into an interior of the third drop of material

ACOUSTIC LEVITATION-ASSISTED CONTACTLESS DROPLET PRINTING

CROSS-REFERENCE TO RELATED APPLICATIONS

This application claims priority to, and the benefit of, U.S. Provisional Patent Application Ser. No. 63/493,849 filed Apr. 3, 2023 entitled "ACOUSTIC LEVITATION-ASSISTED CONTACTLESS DROPLET PRINTING." The foregoing application is hereby incorporated by reference in its entirety for all purposes, including but not limited to those portions that specifically appear hereinafter, but except for any subject matter disclaimers or disavowals, and except to the extent that the incorporated material is inconsistent with the express disclosure herein, in which case the language in this disclosure shall control.

FEDERALLY SPONSORED RESEARCH DEVELOPMENT

This invention was made with government support under NSF grant No. 2114119 awarded by the National Science Foundation. The government has certain rights in the invention.

FIELD

This disclosure generally relates to additive manufacturing, and more particularly to contactless additive manufacturing systems, methods, and devices using acoustically levitated droplets.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may be inventions.

Artificial cells enable a deeper understanding of cell structure and operation. The manufacturing of artificial cells has become a very popular area of study. Efforts to develop artificial cells allow the investigation of autonomous systems with cell-like attributes in controlled conditions. Cells are complex structures and have functional units called intracellular compartments, which regulate chemical and biological processes. This intracellular region is protected by a membrane that separates internal content from the surrounding. When developing artificial cells that have cell-like functions, replicating the structure of the intracellular compartment is important to better mimic biological cell functionality. Artificial cells have numerous potential applications, including the use for the treatment of liver disease, where current methods like transplants and cell therapies suffer challenges of negative immune response and limited efficiency duration.

As an interesting phenomenon, acoustic levitation takes advantage of the fact that sound waves carry acoustic potential energies to exert radiation force on the tiny and light-weight object, in which the force levitates the object in an anti-gravity and contactless manner because of the force directly against gravity. Suspension of droplets makes them ideal for constructing spherical artificial cells.

Currently, there are several recognized methods of fabricating artificial cells. The two major approaches in the fabrication of artificial cells are the top-down approach and the bottom-up approach. The top-down approach deals with generating a minimal cell from an already existing biological organism, by removing cellular parts that are not essential to the survival of the organism and adding components for specific functions. However, the top-down approach often leaves genomes with unknown functions, and so does not allow for the understanding of the minimal requirement for living cells. The bottom-up approach is an additive approach that involves fabricating artificial cells using basic units derived from natural organisms or synthetic processes. When using the bottom-up approach to build artificial cells, structures can be formed by encapsulating lipid-bounded aqueous droplets and biomolecule complexes within a host droplet. Each compartment of the host droplet could contain different biochemical species. Some studies show the use of organelle-like components that are analogous to the intracellular compartments and act as functional units, regulating sequential reactions and harvesting energy within the artificial cells.

Advancements in 3D printing technologies have allowed for the creation of numerous novel structures. These techniques, though, are not well adapted for use with liquids, especially at the droplet level. Therefore, there is a need for new a method for acoustic levitation-assisted contactless droplet printing.

SUMMARY

Disclosed herein is a method for universal contactless printing, the method comprising: forming a three-dimensional printed structure via a drop-by-drop process, the drop-by-drop process comprising: depositing an initial drop of material into a sound field, curing the initial drop of material via a curing step, securing the initial drop of material to a building platform; and repeating a deposition cycle until the three-dimensional printed structure is formed, the deposition cycle comprising: moving the building platform; depositing a subsequent drop of material into the sound field; curing the subsequent drop of material via the curing step; and securing the subsequent drop of material to a previously cured drop of material in response to the curing the subsequent drop of material.

In various embodiments, a first of the previously cured drop of material is the initial drop of material.

In various embodiments, the moving the building platform further comprises traversing the building platform along a set building path.

In various embodiments, the curing step for the initial drop of material further comprises exposing the initial drop of material to one or more light sources. In various embodiments, each of the one or more light sources is configured to emit light having an average wavelength that is between 10 nm and 400 nm.

In various embodiments, the method can further comprise generating the sound field prior to forming the three-dimensional printed structure. In various embodiments, the generating the sound field comprises activating a plurality of ultrasonic transducers.

In various embodiments, in response to the depositing the initial drop of material into the sound field, the initial drop of material is suspended within the sound field.

In various embodiments, the previously cured drop of material is selected from any of a plurality of previously cured drops of material.

In various embodiments, the deposition cycle for at least one of the subsequent drop of material comprises manipulating the subsequent drop of material prior to the curing step. In various embodiments, the manipulating the subsequent drop of material comprises modulating an acoustic pressure of the sound field. In various embodiments, the modulating the acoustic pressure of the sound field comprises increasing the acoustic pressure to modify a shape of the subsequent drop of material to be generally convex. In various embodiments, the modulating the acoustic pressure of the sound field further comprises decreasing the acoustic pressure to modify a shape of the subsequent drop of material to be generally concave. In various embodiments, the manipulating the subsequent drop of material further comprises extruding an interior drop of material into the subsequent drop of material prior to the curing step. In various embodiments, the interior drop of material is enclosed entirely by the subsequent drop of material after the curing step.

In various embodiments, the curing step comprises heating one of the initial drop of material or the subsequent drop of material.

A method for one of encapsulating a drug or forming a microenvironment for one or more active cells is disclosed herein. In various embodiments, the method comprising: suspending a liquid droplet in a sound field; injecting a biocompatible solution to surround the droplet; and curing the biocompatible solution to enclose the drug droplet within a cured shell and form the drug or the microenvironment for the one or more active cells.

In various embodiments, the method is for encapsulating a drug, and the droplet is a liquid drug droplet containing one or more active ingredients therein.

In various embodiments, the method is for forming a microenvironment, and the liquid droplet is a culture medium with one or more active cells disposed therein.

A method for additively manufacturing a multi-shell structure is disclosed herein. In various embodiments, the method comprising: extruding a first drop of material into a sound field, the first drop of material levitating within the sound field in response to being released into the sound field; and extruding a second drop of material into an interior of the first drop of material.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
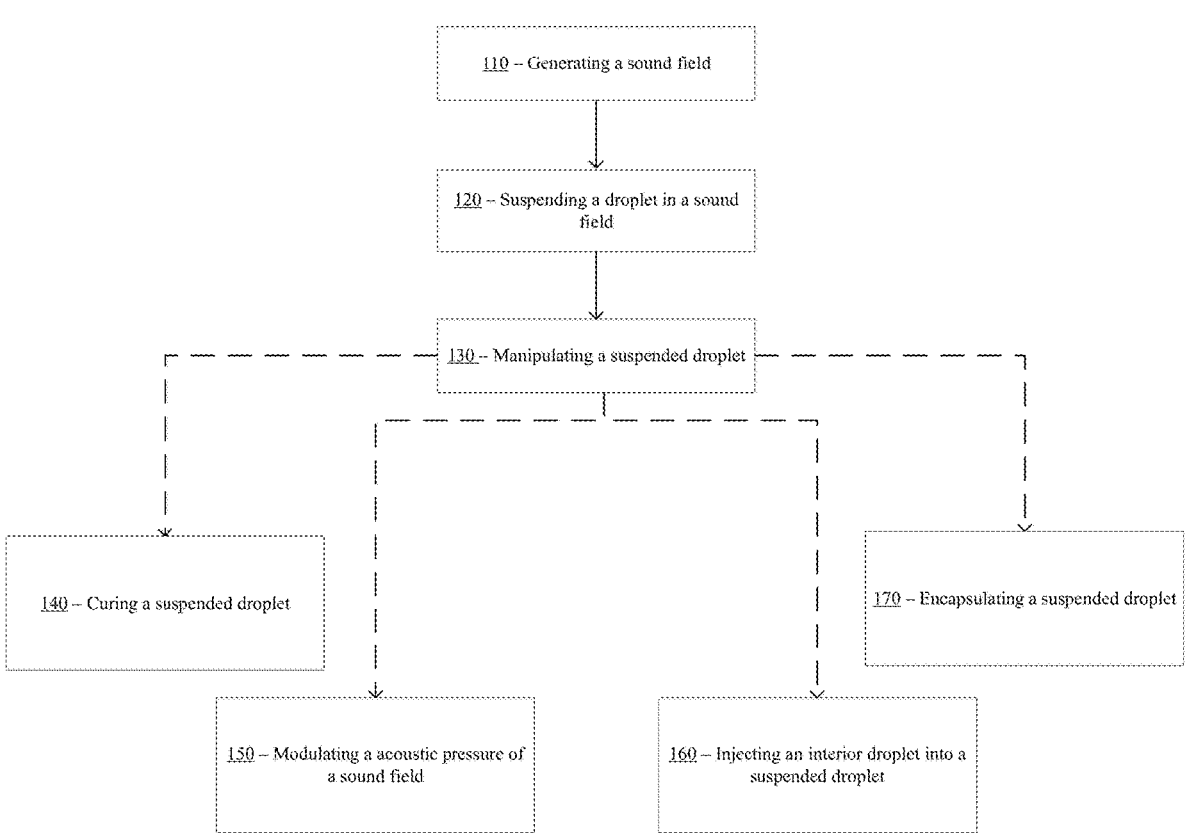
FIG. 1 illustrates a flowchart for a method, in accordance with various embodiments.
Figure 2A:
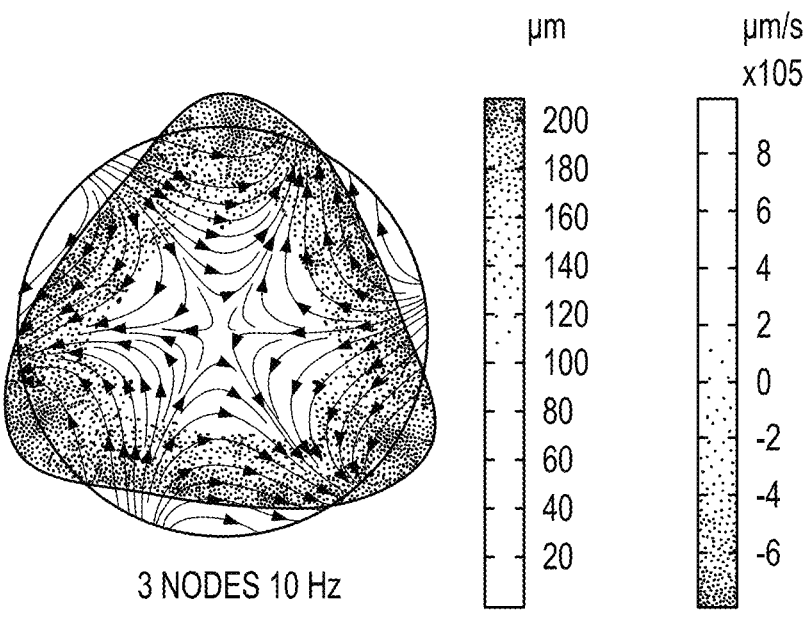
FIG. 2A illustrates exemplary configurations of a sound field, in accordance with various embodiments.
Figure 2B:
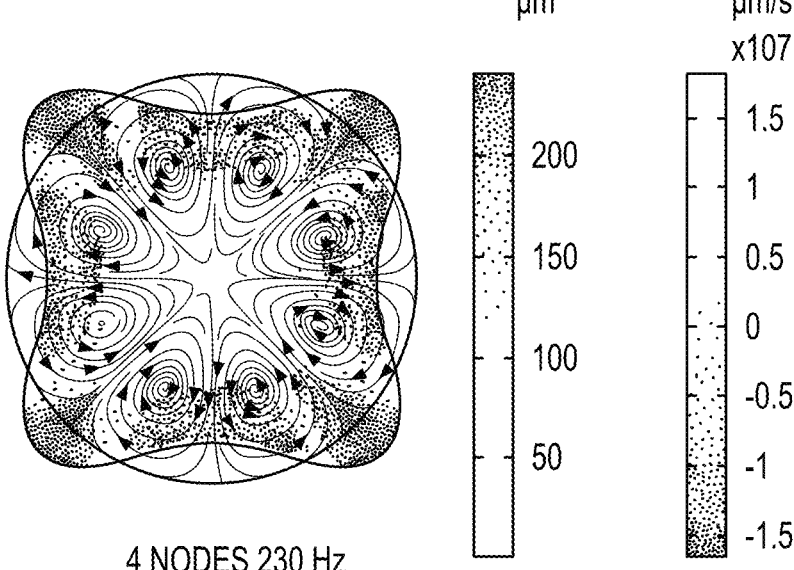
FIG. 2B illustrates exemplary configurations of a sound field, in accordance with various embodiments.
Figure 2C:
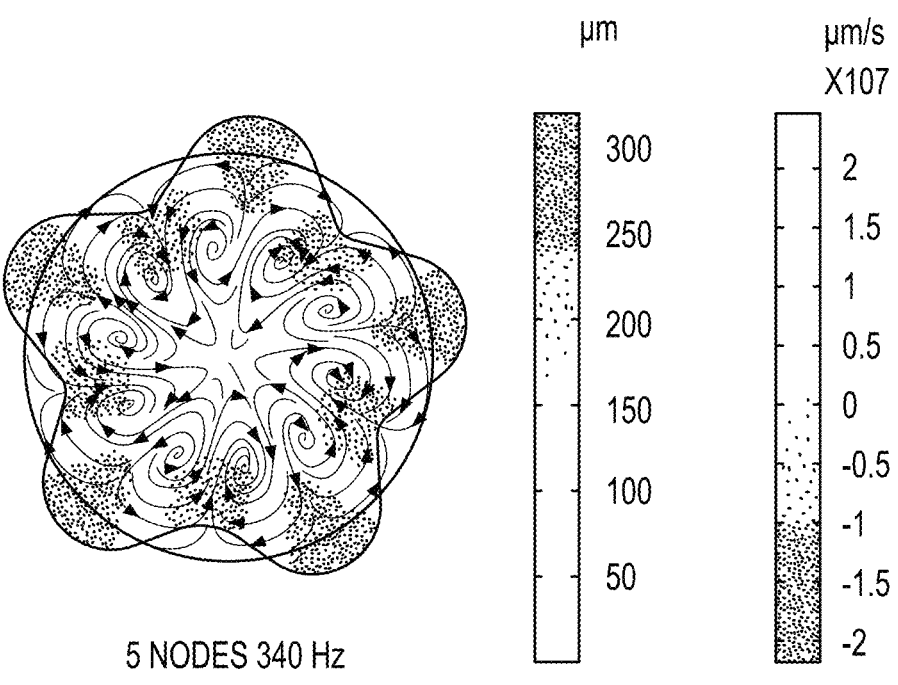
FIG. 2C illustrates exemplary configurations of a sound field, in accordance with various embodiments.
Figure 2D:
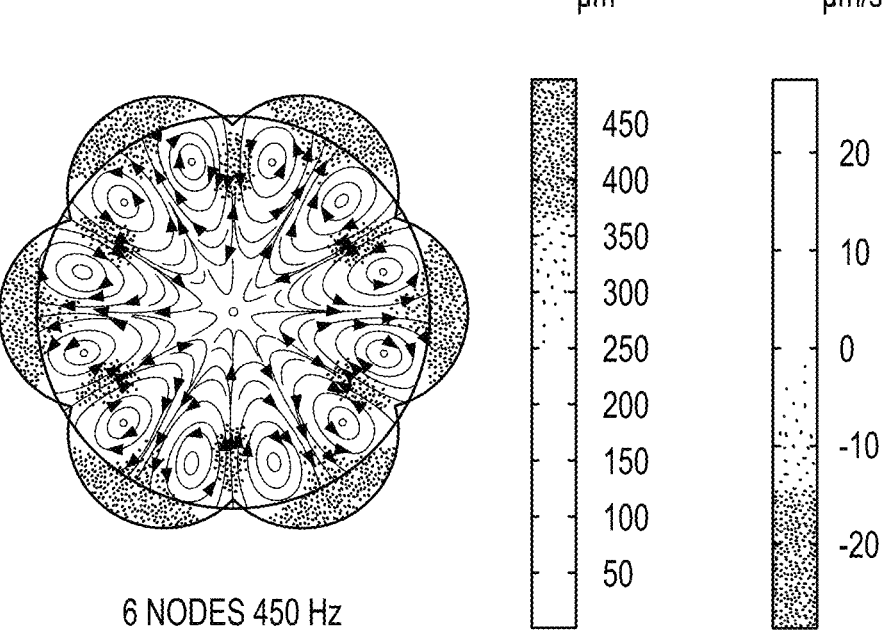
FIG. 2D illustrates exemplary configurations of a sound field, in accordance with various embodiments.
Figure 2E:
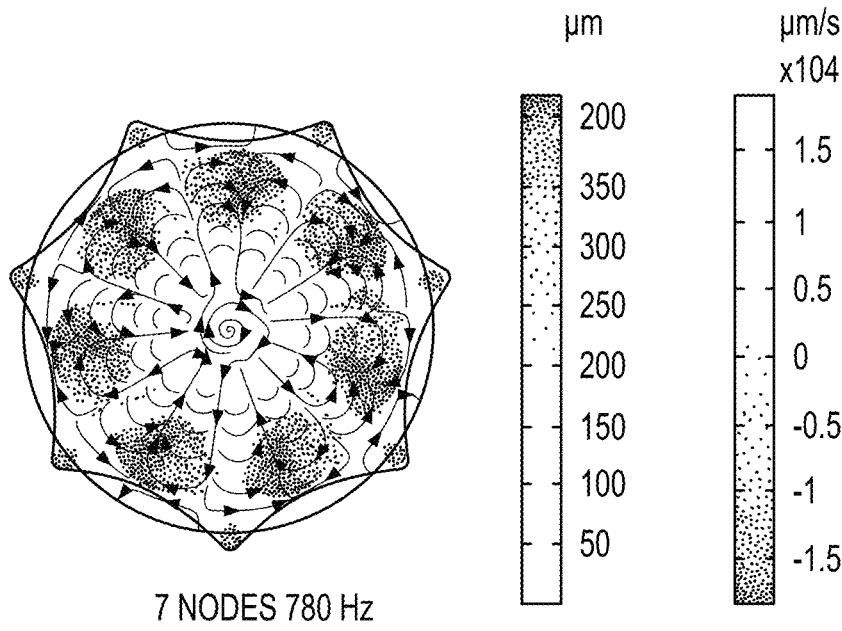
FIG. 2E illustrates exemplary configurations of a sound field, in accordance with various embodiments.
Figure 2F:
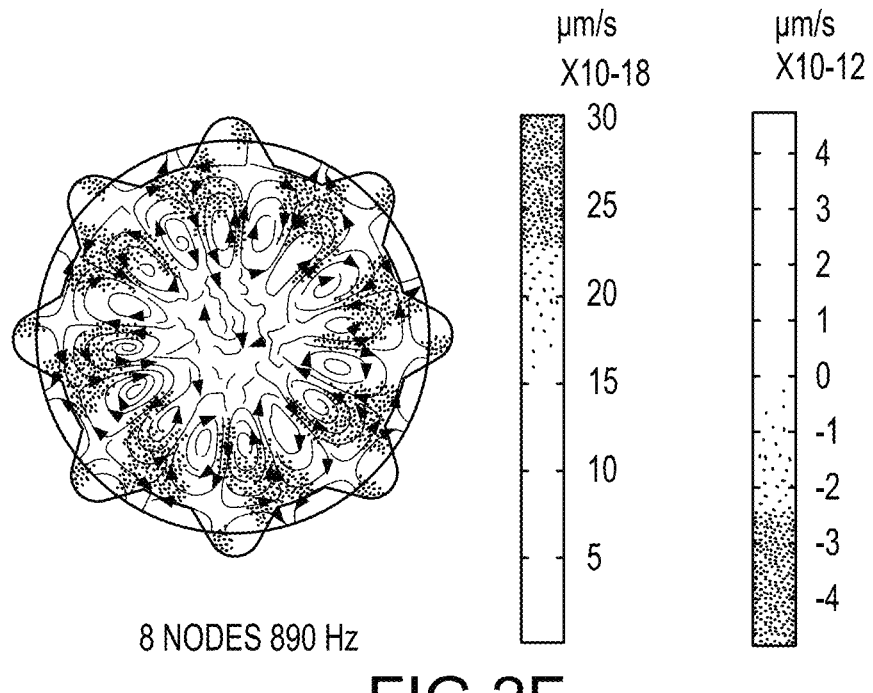
FIG. 2F illustrates exemplary configurations of a sound field, in accordance with various embodiments.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

The intracellular compartments of cells are complex. To fabricate artificial cells, it is helpful to study and develop similar compartmentalized structures, which form the basis of cell functionality. Ideally, cells should have a shell-like hollow structure, with a membrane separating an internal functional unit that regulates important processes. The architecture of the compartments determines functionality. However, not enough effort has been put into investigating the various methods of compartmentalization within artificial cells and the subsequent functionality of these architectures. One reason for this is the challenge of creating multicompartmental structures with distributions of biochemical reagents that can be controlled. Such a process is a high-order emulsification process. Compared with other physical fields such as a magnetic field and/or an electrical field, acoustic assisted additive manufacturing exhibits various potential applications. For example, acoustic field manipulation is contactless and requires no interface. The mechanism involves trapping small waves in standing waves and the potential well of the sound field. However, the use of acoustic levitation by ultrasonic arrays has not been fully investigated and much of its applications in regard to fluid mechanics are still unknown.

Disclosed herein is a low-cost, efficient method of acoustic printing. Although described further herein as being utilized for printing of soft materials using intracellular architecture to mimic cell functionality, the present disclosure is not limited in this regard. For example, the method of acoustic printing disclosed herein could be utilized for additively manufacturing any component that has an outer structure different from an inner structure, in accordance with various embodiments. In various embodiments, the systems, methods, and devices disclosed herein could help advance drug delivery mechanisms and/or generate high-quality, low-cost artificial cells.

Disclosed herein is an additive manufacturing process comprising acoustic levitation-assisted contactless droplet printing ("ALCDP"). In various embodiments, the ALCDP process can be utilized for the fabrication of artificial cells. Firstly, through the use of simulations, the potential for ultrasonic levitation was observed, a sound pressure field map was generated, droplet resonance morphology was analyzed, and convection modes were visually displayed. Considering the light sensitivity of the materials and aiming to fabricate flexible and resilient shell structures under the guidance of the studied relationship between exposure time and curing thickness, the top-bottom-side (TBS), top-bottom (TB), and TBS+TB illumination strategies were developed for photosensitive, non-photosensitive, and semi-photosensitive materials, respectively. "Sensitivity" as referred to herein is an amount to which an object reacts upon receiving photons in response to exposure to light (e.g., ultraviolet light or the like).

As described further herein, a cured shell structure formed in accordance with the ALCDP process can be as thin as tens of microns and return to their original shape after being subjected to large ratios of deformation, in accordance with various embodiments. Moreover, the "oil trapping method" as described further herein provided an effective platform for the fabrication of single-core and multi-core cell structures, and its solidified spherical structure can be as small as 300-800 μm, in accordance with various embodiments. This solidified spherical structure is at least 3 times smaller than that of the direct injection method. In various embodiments, the ALCDP process can allow control of the directional movement of the printed magnetic cell structure in the complex channel under the magnetic attraction. In various embodiments, an autonomous motion trajectory of the magnetic cell structure on the liquid surface can be tracked, controlled, and/or manipulated under the influence of the magnetic field. In various embodiments, printed artificial cells that are manufactured via the ALCDP process disclosed herein have the potential to enhance the understanding of biological cells and/or can be used in drug delivery and treatment of chronic illnesses. As described further herein, the systems, processes, and devices disclosed herein provides an efficient, autonomous, and low-cost way for artificial cell development, in accordance with various embodiments.

Benefiting from the principle of additive manufacturing and the restraint of droplet shape by an ultrasonic field as disclosed herein, methods can be utilized for printing complex 3D structures drop-by-drop in air or in a zero-gravity environment. This method is particularly suitable for manipulating the morphology of droplets in microgravity or zero-gravity environments.

Regarding the specific printing process, the photocurable droplet is firstly extruded from the nozzle and suspended in the node of the standing wave. The droplet is then cured by the light from side (or sides), top and bottom, and sticks to the multi-axis building platform, which moves a certain distance, leaving the node empty for the following droplet. By repeating the injection and solidification of suspended droplets adjacent to previously solidified droplets, as well as controlling the moving path of the multi-axis platform, three-dimensionally complex drop-by-drop structures can be obtained.

Disclosed herein is a method for encapsulating drugs using an ultrasonic field and biocompatible solution (e.g., a PEGDA solution). Specifically, the drug droplet is initially suspended in the ultrasonic field, followed by the injection of PEGDA solution to cover the drug droplet. Subsequently, a light source on the side, bottom, and top of the device is activated to solidify the PEGDA thin layer, resulting in a capsule whose surface is the shell, and the cavity is still liquid drug.

Notably, the PEGDA shell can be dissolved in a strong acid or alkali environment, leading to the rapid release of the liquid drug and shortening the time for drug efficacy. Furthermore, by adjusting the thickness of the PEGDA shell, the capsule can be selectively released at a specific location in the intestinal tract, as the distance the capsule moves is related to the shell thickness. This contactless printing technology holds promise for the development of drug delivery systems with enhanced targeted and controlled release capabilities.

Disclosed herein is a method for encapsulating a microenvironment for study of one or more active cells. For example, active cells can be encapsulated in PEGDA capsids to study the growth, reproduction, and aggregation of cells in a 3D microenvironment. First, suspend the culture medium containing cells in the ultrasonic field. Then, inject PEGDA solution to cover the culture medium and turn on the light source on the side, bottom and top of the device to solidify the PEGDA thin outer shell, thus sealing the cells and the culture medium. This allows for the observation of growth, reproduction, aggregation, and transportation.

Understanding the growth and reproduction process of individual cells can provide profound insights into how cells adapt to different environmental and biological conditions, as well as how they respond to internal and external signals. This has significant theoretical and practical implications for fields such as biology, ecology, and medicine. The growth and reproduction process of individual cells serves as the foundation for various diseases and biological processes. For instance, cancer is caused by the uncontrolled proliferation and division of individual cells, and understanding the process of cell growth and reproduction can provide new approaches and methods for cancer prevention and treatment.

Moreover, the growth and reproduction of many microbial pathogens are also caused by the proliferation and division of individual cells, which have important implications for disease prevention and control.

Ultrasonic levitation can be employed to fabricate liquid zoom lenses, which are a novel type of liquid lens whose focal length can be controlled by adjusting the acoustic pressure through applied voltage. When the acoustic pressure is low, the droplet takes an elliptical shape, corresponding to a convex lens. Upon increasing the acoustic pressure to a certain extent, the droplet is compressed into a dumbbell shape, corresponding to a concave lens. The liquid zoom lenses can be manufactured by the methods disclosed herein or operated in accordance with the methods disclosed herein. In various embodiments, liquid zoom lenses fabricated (or operated) in this manner can provide a fast response, small size, and low cost, and can be widely applied in fields such as optical imaging, laser focusing, optical communication, and biomedicine.

A method for manufacturing multi-shell structures that involves an ultrasonic suspension device and a multi-nozzle extrusion system with aligned needle tips is disclosed herein. Initially, a first droplet is extruded from a first nozzle, and because the droplet-shaped material covers the end of a second nozzle, a second material deposited from the second nozzle can be extruded into the first droplet. By repeating this process, new material can be extruded inside previously extruded material, ultimately resulting in a concentric shell structure that is multi-material and multi-layered. This method offers several advantages, including the ability to create complex and intricate structures. It has potential applications in various fields, such as biomedical engineering and nanotechnology.

Referring now to FIG. 1, a method 100 for performing the ALCDP process is illustrated, in accordance with various embodiments. The method 100 is merely exemplary and is not limited to the embodiments presented herein. Method 100 can be employed in many different embodiments or examples not specifically depicted or described herein. In some embodiments, the activities of method 100 can be performed in the order presented. In other embodiments, the activities of method 100 can be performed in any suitable order. In still other embodiments, one or more of the activities of method 100 can be combined or skipped.

In various embodiments, the method 100 can comprise preparing one or more materials for use in the ALCDP process (step 102). Although described herein as including a step for preparing one or more materials, the present disclosure is not limited in this regard. For example, each of the materials utilized in method 100 can be pre-prepared, pre-made, or the like and would still be within the scope of this disclosure. Stated another way, a photocuring process for a photosensitive material can be different from a photocuring process for a semi-photosensitive material, which can be different from a non-photosensitive material, in accordance with various embodiments.

In various embodiments, one of the one or more materials comprises a liquid. For example, one of the one or more materials can comprise a biocompatible solution, a liquid drug, a culture medium with one or more active cells, an optical grade material, a polymeric material, or the like. In various embodiments, the one of the one or more materials can be configured to remain in liquid form, while a second of the one or more materials can be configured to harden in response to a curing step. In this regard, as described further herein, a liquid can be disposed within, and entirely encapsulated by, a solid shell in response to manufacturing a product via the method 100, in accordance with various embodiments.

In various embodiments, the one or more materials prepared in step 102 can comprise a non-photosensitive material, a semi-photosensitive material, or a photosensitive material. As described further herein, based on a photosensitivity of the material utilized in method 100, a corresponding photocuring process can be utilized.

Although described herein with exemplary materials, the present disclosure is not limited in this regard. For example, any material capable of being photocured is within the scope of this disclosure.

In various embodiments, at least one of the one or more materials can correspond to a cytoplasm and/or cytosol of an artificial cell. In various embodiments, the one or more materials prepared in step 102 can comprise water or some other solvent. In various embodiments, the one or more materials in step 102 can comprise various biological molecules, ligands, monomers, and/or polymers. For example, the one or more materials can comprise proteins, amino acids, nucleic acids, lipids, and/or salts. In various embodiments, the one of the one or more materials can be encapsulated in a membrane formed from another of the one or more materials.

In various embodiments, method 100 can comprise a step 110 of generating a sound field. A sound field can be generated in a number of ways. For example, a sound field can be generated using a plurality of ultrasonic transducers. Generally speaking, an ultrasonic transducer can comprise a device capable of generating and/or detecting ultrasound energy. In various embodiments, ultrasonic transducers can be configured to generate sound fields comprising both higher pressure and lower pressure portions. In this way, a droplet can be suspended in a lower pressure portion of a sound field while resting on or proximate to a higher pressure portion of the sound field. While two ultrasonic transducers can be used to create a sound field, a number of different sound fields can be created using different ultrasonic transducer configurations, numbers of ultrasonic transducers, and frequency of sound waves. For example, FIG. 2 displays a number of sound fields created by different ultrasonic transducer configurations, numbers of ultrasonic transducers, and frequency of sound waves. As can be seen from FIG. 2, different configurations of ultrasonic transducers (referred to as "nodes" in FIG. 2) can be used to create differently shaped areas of higher and lower pressure portions of the sound field, in accordance with various embodiments.

In various embodiments, method 100 can further comprise a step 120 of suspending (e.g., levitating) a droplet in a sound field. In various embodiments, a droplet can correspond to a cytoplasm and/or cytosol of an artificial cell. In various embodiments, a droplet can comprise water or some other solvent. In further embodiments, a droplet can comprise various biological molecules, ligands, monomers, and/or polymers. For example, a droplet can comprise proteins, amino acids, nucleic acids, lipids, and/or salts. In some embodiments, a droplet can be encapsulated in a membrane. For example, a droplet can be encapsulated in a lipid membrane (e.g., a lipid monolayer or a lipid bilayer). As another example, a droplet can be encapsulated in a multi-layer membrane, such as a cell wall. In various embodiments, a droplet can have no membrane and be held together by surface tension of the solvent. The present disclosure is not limited in this regard. In various embodiments, a droplet can comprise a cell (e.g., a single cellular organism and/or a cell from a multi-cellular organism.

In various embodiments, method 100 can comprise a step 130 of manipulating a suspended droplet. A suspended droplet can be manipulated in a number of ways, as described below in one or more of optional steps 140-170.

Figures 3A, 3B:
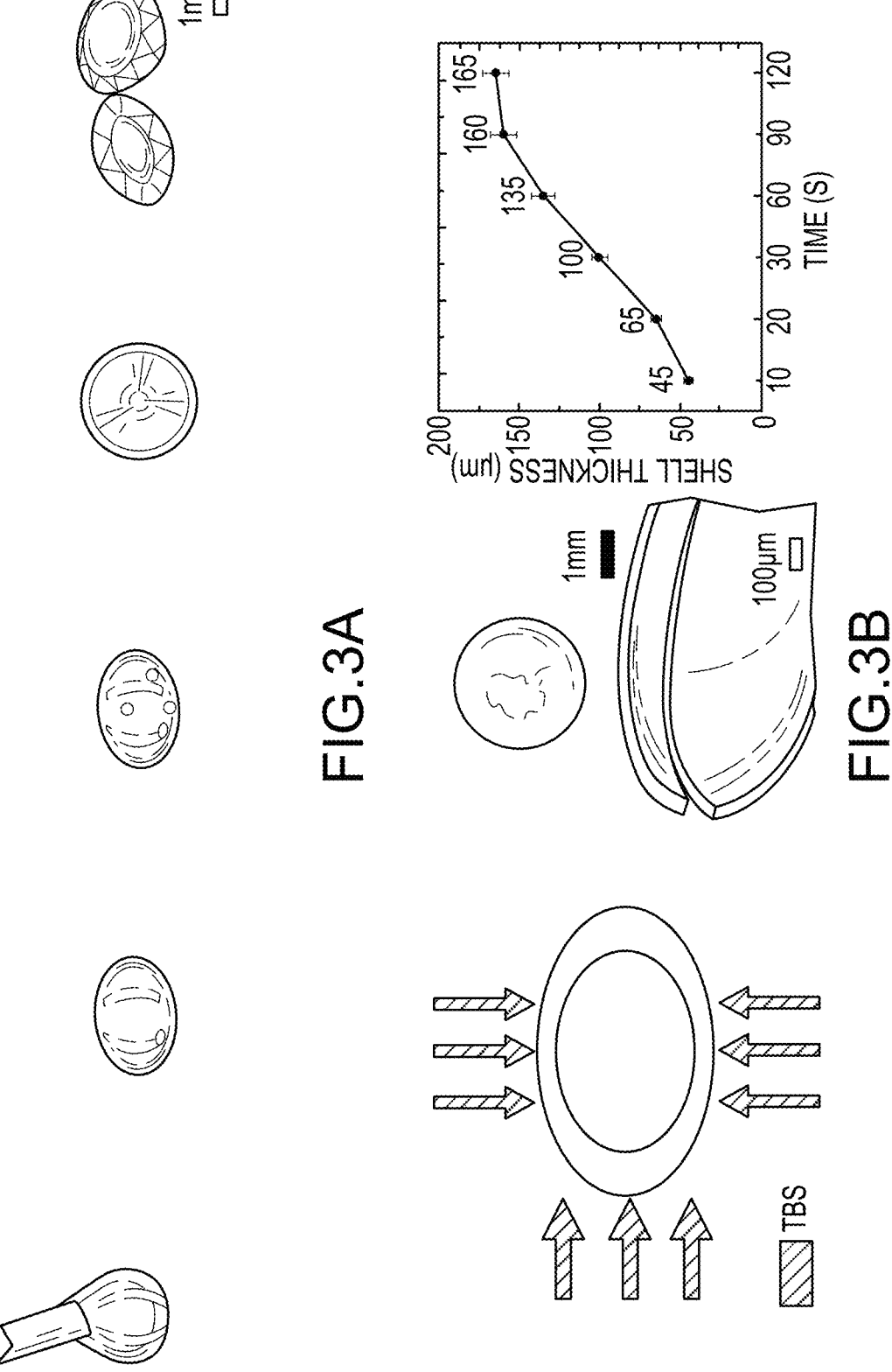
FIG. 3A illustrates exemplary photocuring process of droplets, in accordance with various embodiments.
FIG. 3B illustrates a top-bottom-side curing strategy and curing characteristics of non-sensitive material, in accordance with various embodiments.
Figures 3C, 3D:
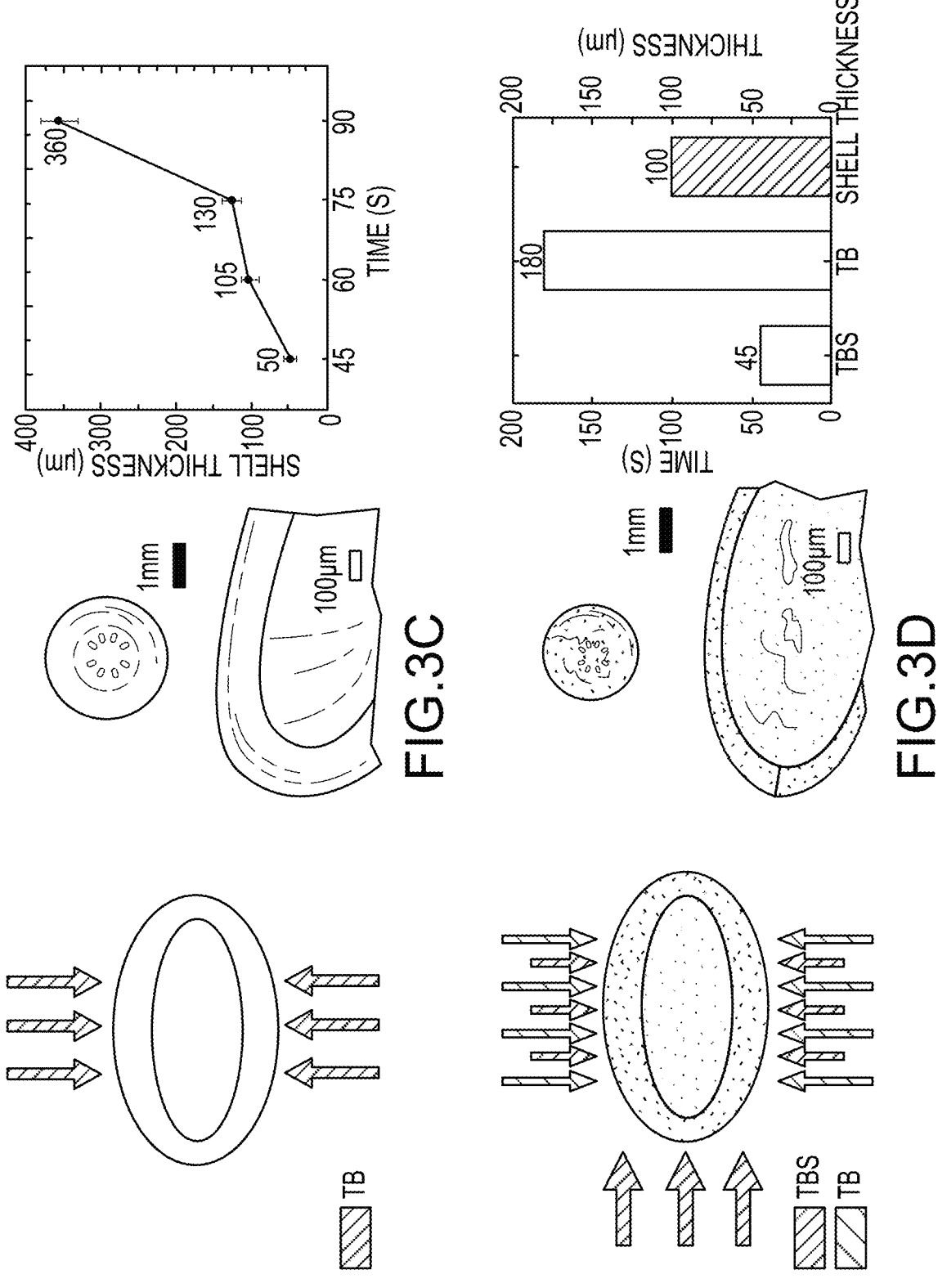
FIG. 3C illustrates a top and bottom curing strategy and curing characteristics of sensitive materials, in accordance with various embodiments.
FIG. 3D illustrates a combined top-bottom-side and top and bottom curing strategy and curing characteristics of semi-sensitive materials.

In various embodiments, method 100 can optionally comprise step 140 of curing a suspended droplet. In various embodiments, the step 140 can be performed concurrently and/or as a part of step 130. In various embodiments, a photosensitive compound present in a suspended droplet can be cured using various light sources. For example, FIG. 3 shows various configurations for and exemplary results of light source curing. In various embodiments, curing a suspended droplet can create a shell on the suspended droplet. Generally speaking, a shell can be differentiated from a membrane by its composition and/or its permeability. In various embodiments, a shell can be nonpermeable. In various embodiments, a local thickness of a shell can be modulated by curing an interior droplet from one or more sides of the droplet while leaving other sides uncured. For example, FIG. 3, portion C(1) shows an exemplary suspended droplet cured from the top and bottom, thereby increasing a thickness of a shell on a top side and a bottom side of the interior droplet while producing a thinner shell on a left side and right side of the interior droplet. In various embodiments, a multi layered droplet can be created. In various embodiments, a liquid layer comprising a curable substance can be applied to a cured suspended droplet and the liquid layer can then be cured. In this way, a second shell can be created on a surface of an already cured suspended droplet, thereby creating a second shelled compartment attached to the suspended droplet.

Figures 4A, 4B:
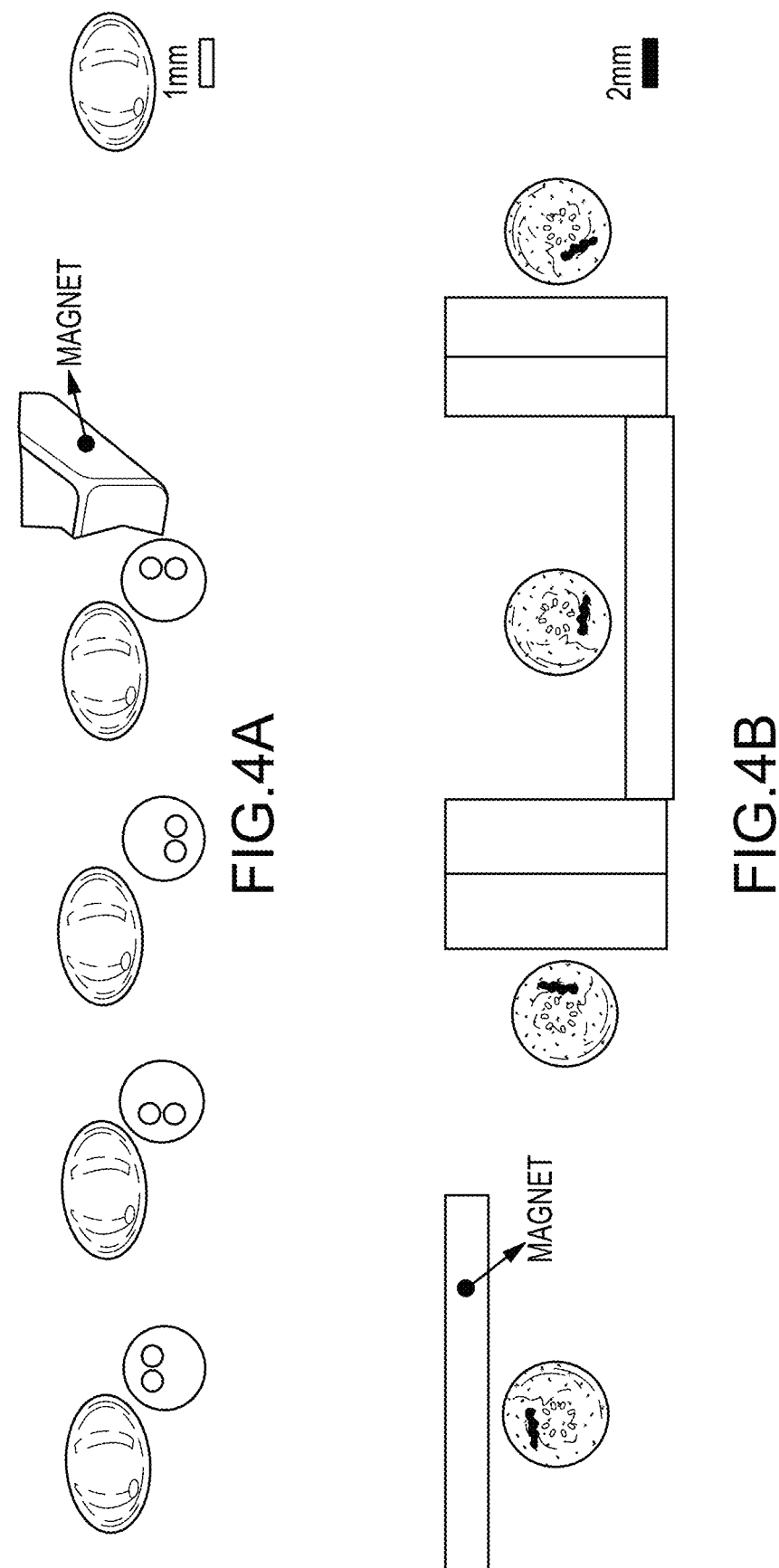
FIG. 4A illustrates a magnetic core preventing a droplet from rotating under action of a magnetic field, in accordance with various embodiments.
FIG. 4B illustrates the motion of a submillimeter scale helical structure wrapped by a shell under a magnetic field, in accordance with various embodiments.
Figures 4C, 4D:
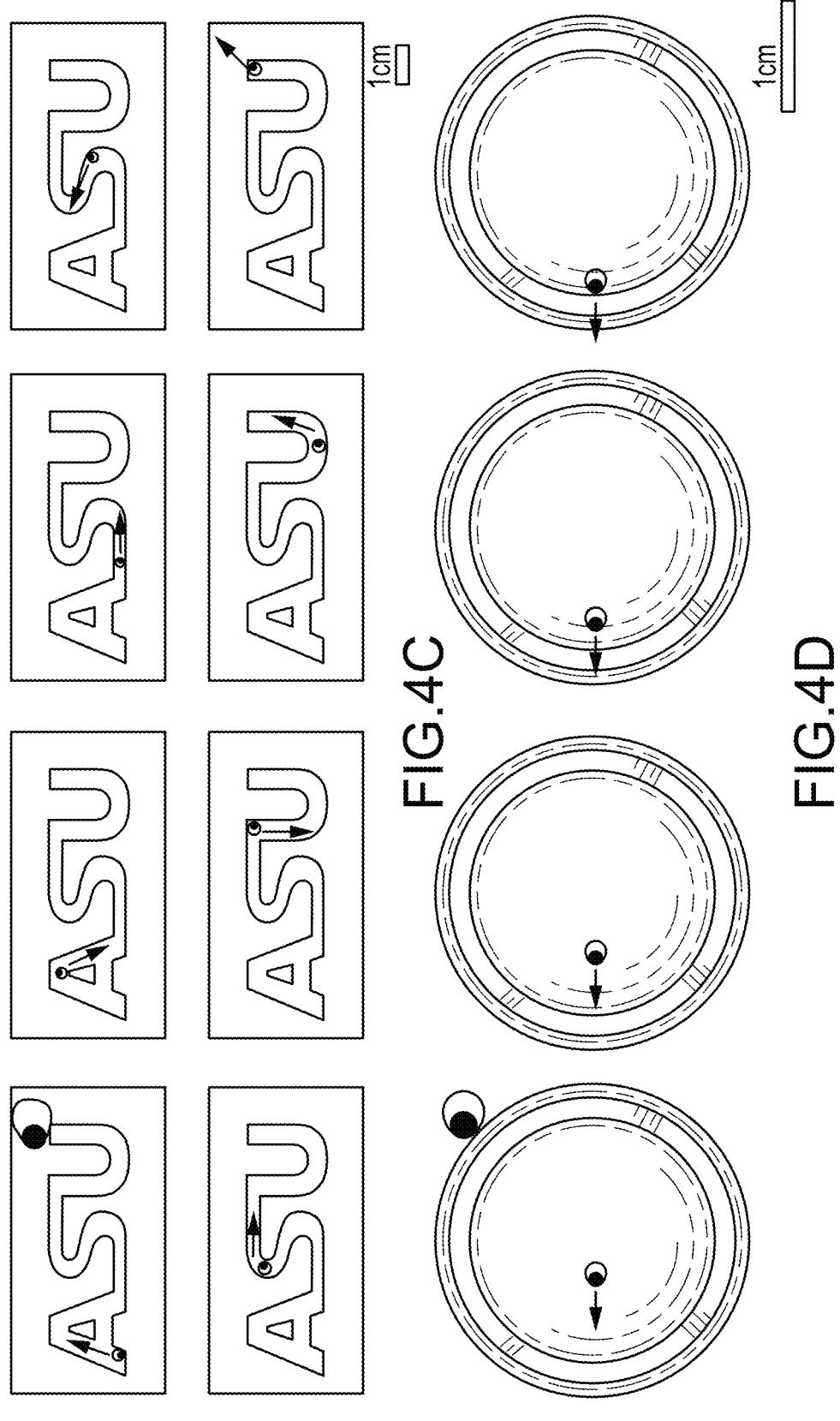
FIG. 4C illustrates a directional movement of a magnetic core structure in an ASU channel under a magnetic drive, in accordance with various embodiments.
FIG. 4D illustrates a deviation of the magnetic core structure suspended at a liquid surface under different magnetic field strengths.

In various embodiments, a cured and suspended droplet manipulated by applying a magnetic field to the droplet. This magnetic field can then push or pull magnetic substances present in the cured and suspended droplet, thereby creating motion for the cured and suspended droplet and/or causing magnetic substance containing compartments in the cured and suspended droplet to migrate within the cured and suspended droplet. In this way, a cured suspended droplet can maintain its shape during and/or after manipulation of the cured suspended droplet. For example, FIG. 4 shows various ways that a cured and suspended droplet can be manipulated using a magnetic field.

Figure 5:
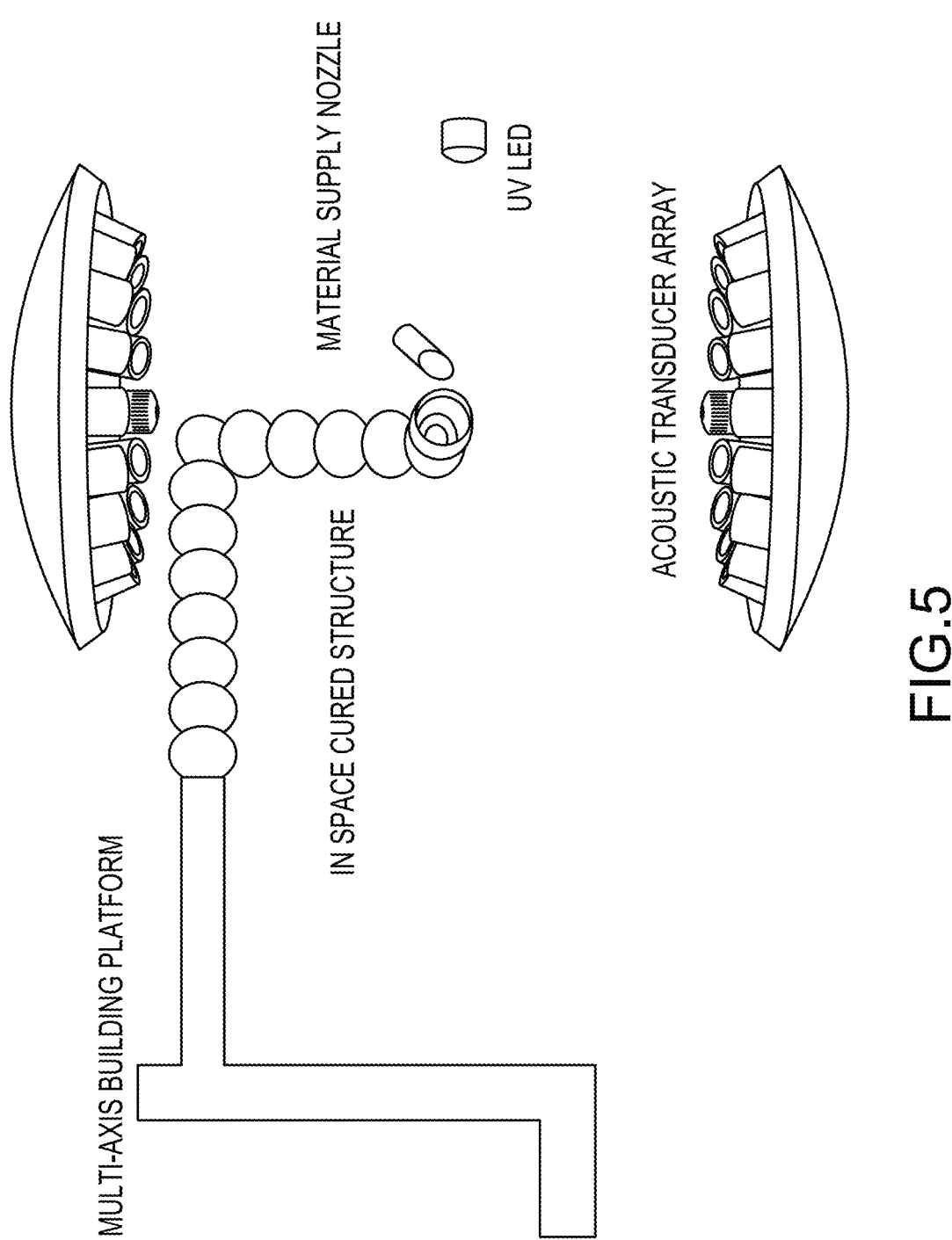
FIG. 5 illustrates an exemplary additive manufacturing system using suspended droplets, in accordance with various embodiments.

In various embodiments, a cured and suspended droplet can be used for additive manufacturing. Generally speaking, additive manufacturing, also known as 3D printing, can be seen as a fabrication process where material is deposited, joined or solidified under computer control. In various embodiments, additive manufacturing can be performed in a layer-by-layer process. For example, FIG. 5 illustrates an exemplary additive manufacturing system. In many embodiments, a cured and suspended droplet can couple or stick to a multi-axis building platform. Once the cured and suspended droplet is coupled or stuck, a multi-axis building platform can moves a certain distance, thereby leaving a node empty for new droplet to be added. This process can then be repeated to create three-dimensionally complex drop-by-drop structures.

Figure 6:
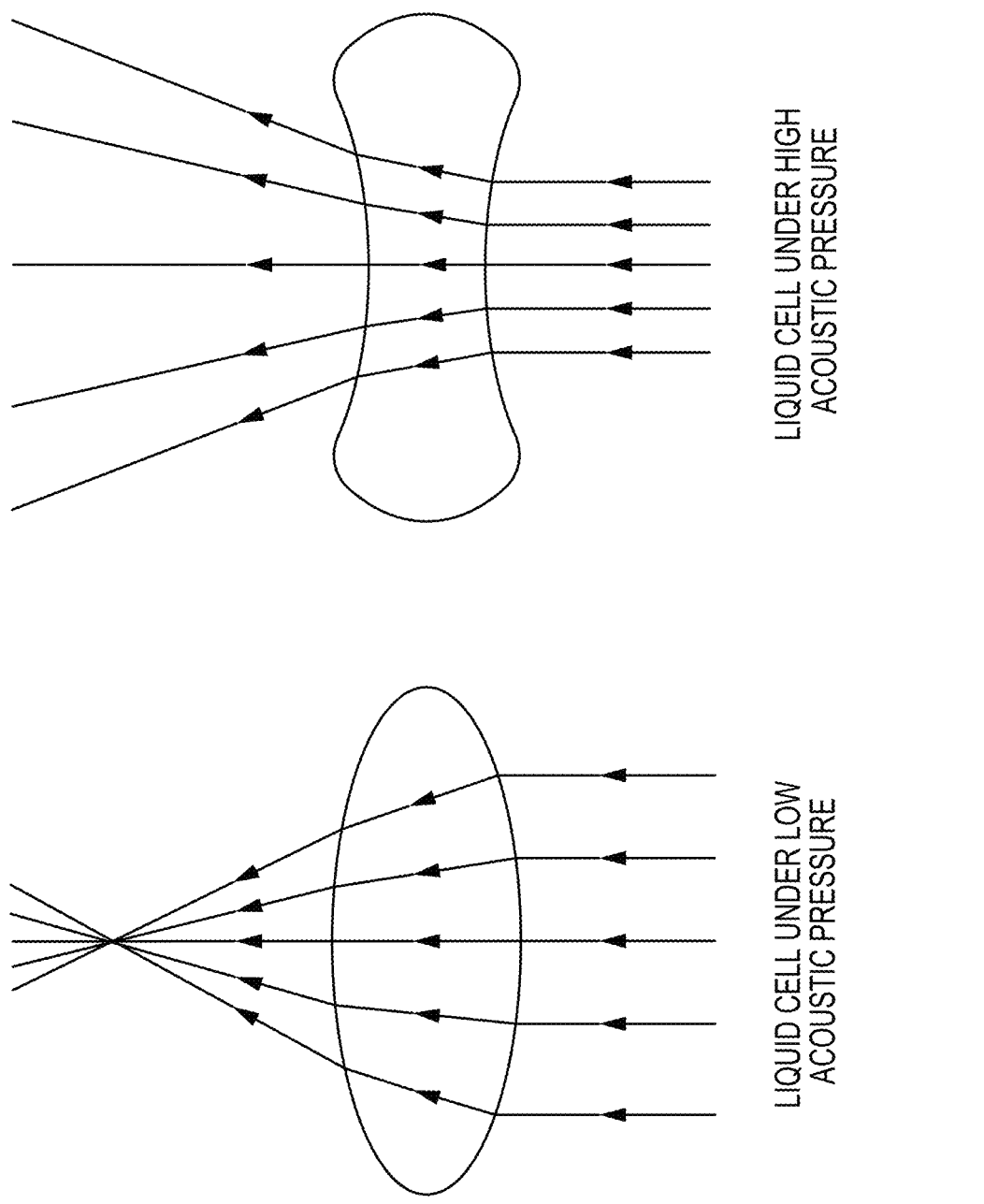
FIG. 6 illustrates exemplary suspended droplets modulated into lens shapes, in accordance with various embodiments.

Returning now to FIG. 1, method 100 can optionally comprise step 150 of modulating an acoustic pressure of a sound field. In these embodiments, step 150 can be performed concurrently and/or as a part of step 130. In various embodiments, acoustic pressure of a sound field can be increased and/or decreased. In some embodiments, a liquid lens can be created using modulated acoustic pressures. For example, FIG. 6 illustrates two exemplary configurations of lenses that can be created using modulated acoustic pressures. For example, when acoustic pressure is low and/or decreased, a suspended droplet can take an elliptical shape. This elliptical shape can correspond to a convex lens. As another example, when acoustic pressure is high and/or increased, a suspended droplet can be compressed into a dumbbell shape. This dumbbell shape can correspond to a concave lens. In many embodiments, acoustic pressures can be modulated such that a force is applied to one side of a combined droplet, thereby causing it to rotate.

Figure 7:
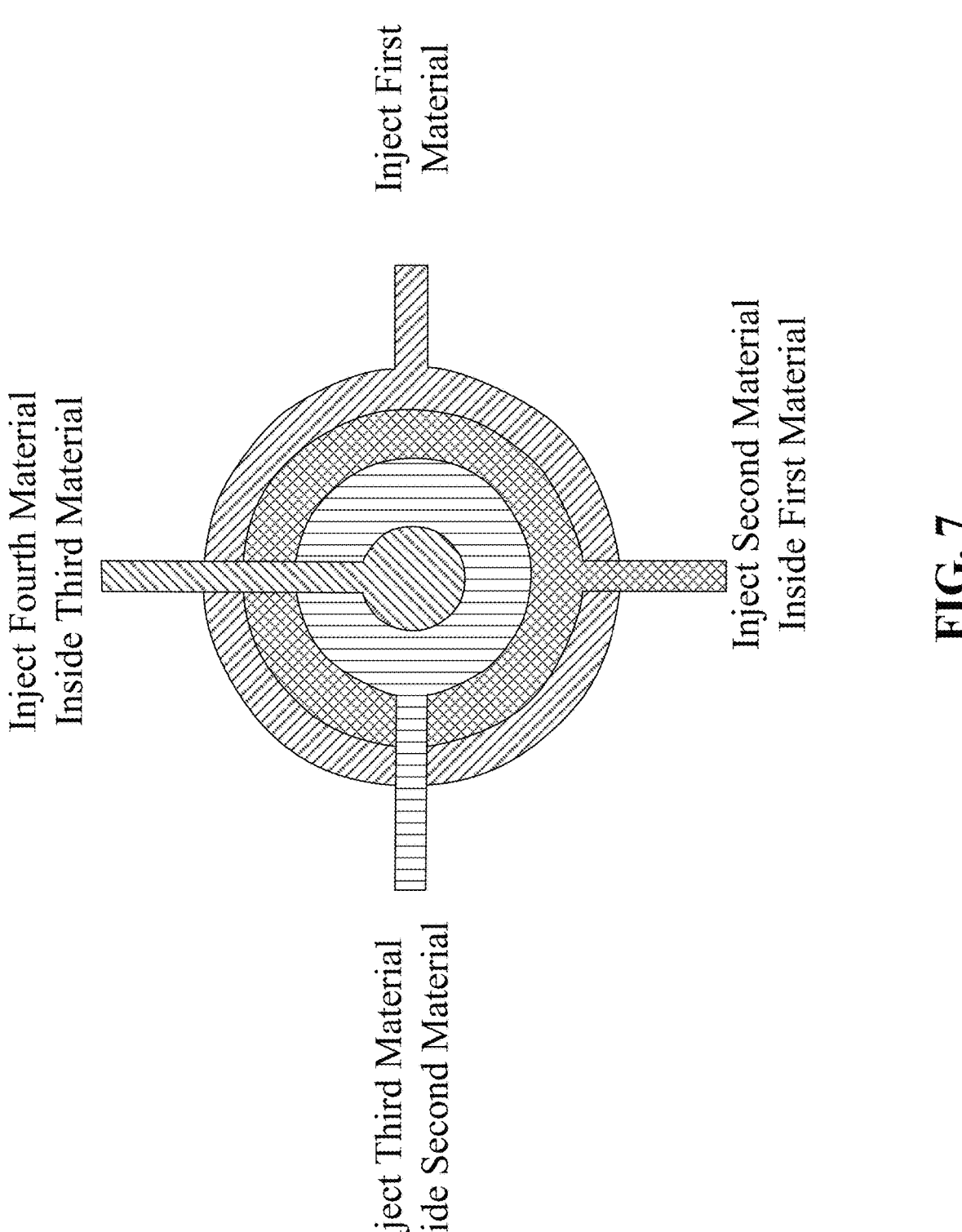
FIG. 7 illustrates an exemplary system for creating a multi-layered droplet, in accordance with various embodiments.

Returning now to FIG. 1, method 100 can optionally comprise step 160 of injecting an interior droplet into a suspended droplet. In these embodiments, step 160 can be performed concurrently and/or as a part of step 130. In various embodiments, an interior droplet can correspond to a cellular organelle and/or an interior compartment of an artificial cell. In various embodiments, a lumen, a needle, and/or pipette can be used to inject an interior droplet into a suspended droplet. In some embodiments, multiple interior droplets can be injected into a suspended droplet to create a multi-compartment and/or multi-layer droplet. In various embodiments, a multi-nozzle extrusion system with aligned needle tips can be used to create a multi-compartment and/or multi-layer droplet. For example, FIG. 7 illustrates an exemplary multi-layer droplet created using a multi-nozzle extrusion system with aligned needle tips. In various embodiments, a first droplet 1 can be extruded from a first nozzle, and, because the first droplet 1 covers an extrusion end of the second nozzle, the second droplet 2 can be extruded into the first droplet 1. By repeating this process (e.g., with droplets 3, 4, 5, etc.), material can be extruded inside previously extruded material. In this way, a concentric shell structure that is multi-material and multi-layered can be created.

Figure 8:
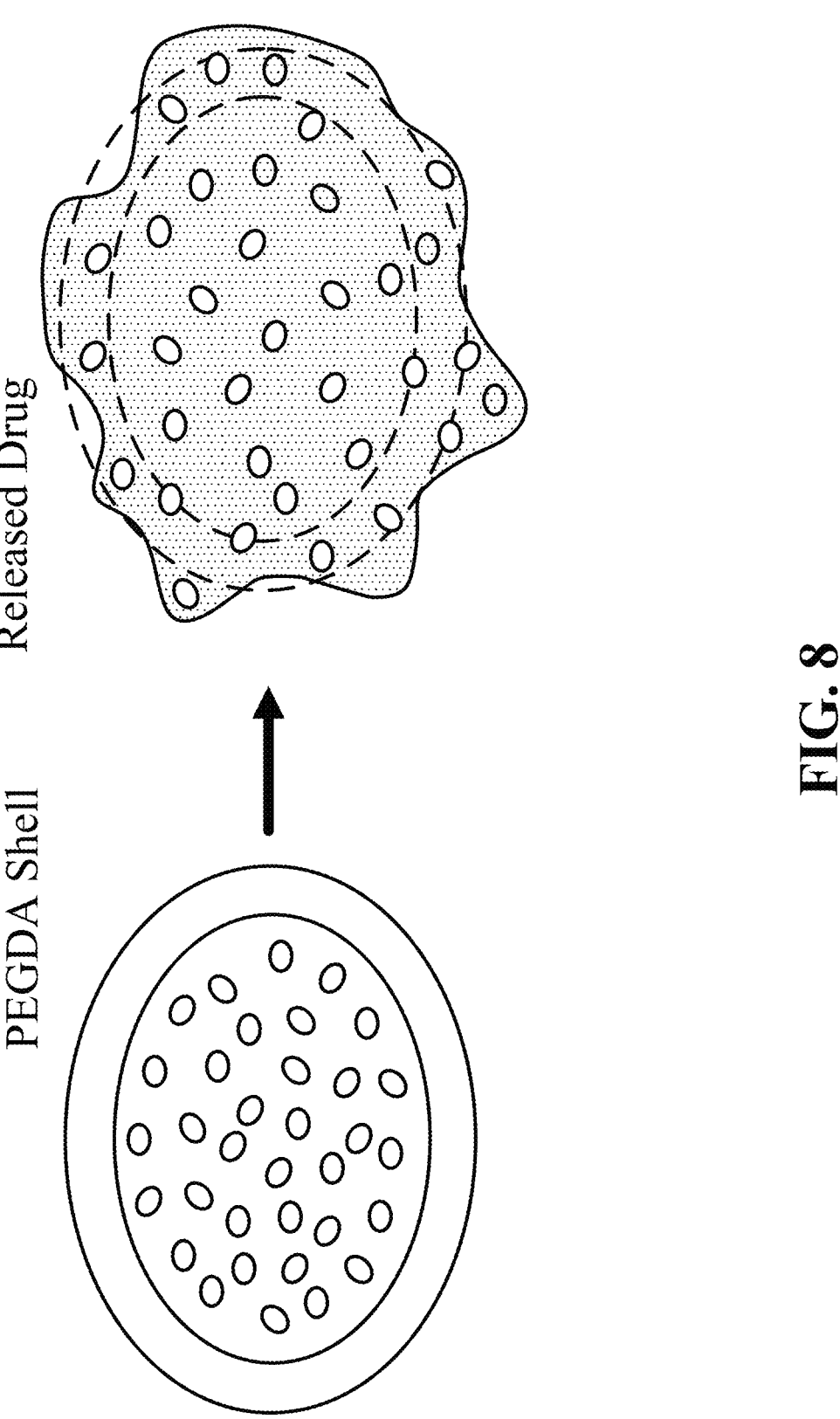
FIG. 8 illustrates an exemplary drug delivery system, in accordance with various embodiments.
Figure 9:
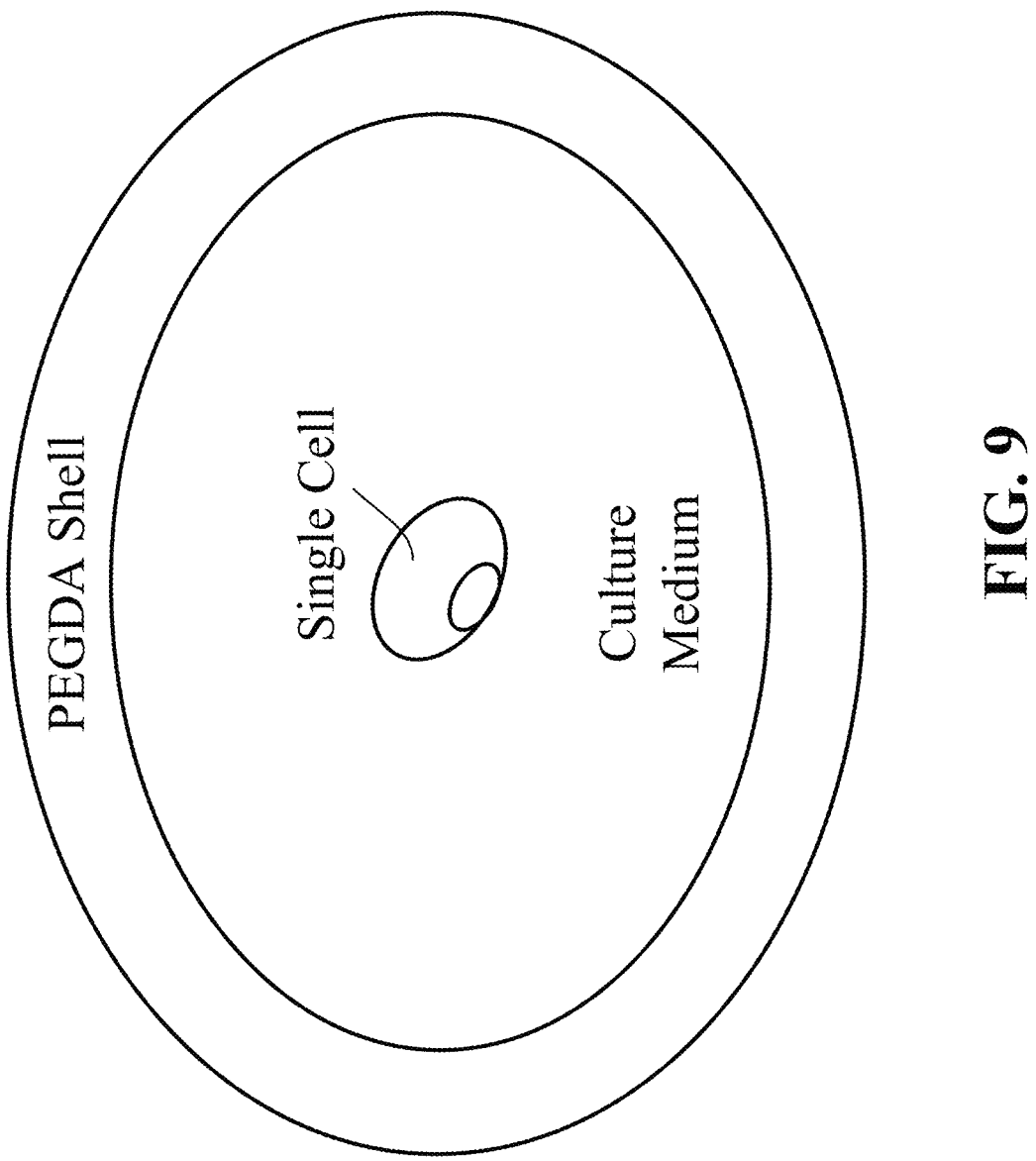
FIG. 9 illustrates an exemplary cellular growth medium, in accordance with various embodiments.

Returning now to FIG. 1, method 100 can optionally comprise step 170 of encapsulating a suspended droplet. In these embodiments, step 170 can be performed concurrently and/or as a part of step 130. In various embodiments, a suspended droplet can be encapsulated in a polymer (e.g., polyethylene glycol diacrylate (PEGDA)). In various embodiments, a needle and/or pipette can be used to apply a layer of polymer to a suspended droplet. In various embodiments, a polymer layer can be cured using a light source (e.g., as described in step 140) to create an encapsulated and suspended droplet. An encapsulated and suspended droplet can be used for a number of purposes. For example, FIG. 8 illustrates an encapsulated droplet used as a drug delivery system. As another example, FIG. 9 illustrates an encapsulated droplet used as a capsid for growing and studying cells in a 3D environment.

Figure 12:
FIG. 12 illustrates a method of three-dimensional printing a structure, in accordance with various embodiments.
Figure 12:
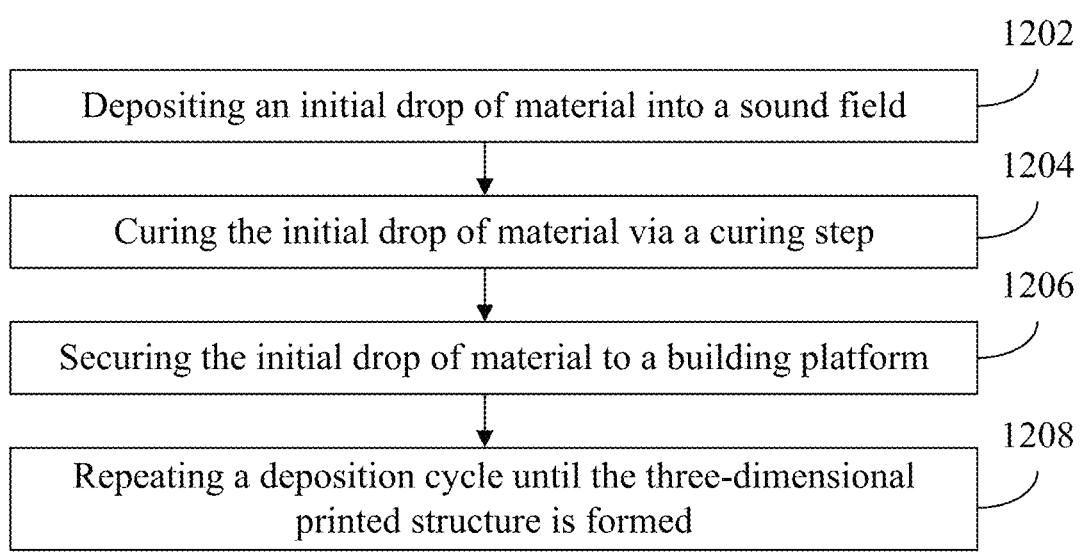

Referring now to FIG. 12, a method 1200 for universal contactless printing is illustrated in accordance with various embodiments. The method 1200 comprises forming a three-dimensional printed structure via a drop-by-drop process (e.g., steps 1202-1208). In various embodiments, the drop-by-drop process comprises depositing an initial drop of material into a sound field (step 1202), curing the initial drop of material via a curing step (step 1204), securing the initial drop of material to a building platform (step 1206), and repeating a deposition cycle until the three-dimensional printed structure is formed (step 1208). With brief reference to FIG. 13, in various embodiments, the deposition cycle of step 1208 can further comprise moving the building platform (step 1302), depositing a subsequent drop of material into the sound field step 1304), curing the subsequent drop of material via the curing step (step 1306), and securing the subsequent drop of material to a previously cured drop of material in response to the curing the subsequent drop of material (step 1308).

In various embodiments, a first of the plurality of previously cured drop of material is the initial drop of material.

In various embodiments, the moving the building platform in step 1302 of the deposition cycle 1300 further comprises traversing the building platform along a set building path. In various embodiments, the set building path can correspond to a complex three-dimensional structure (e.g., the three-dimensional printed structure being formed from the drop-by-drop process of the method 1200 from FIG. 12).

In various embodiments, the curing step for the initial drop of material (e.g., step 1204 of method 1200) further comprises exposing the initial drop of material to one or more light sources. In various embodiments, the one or more light sources can be arranged to provide curing in accordance with FIG. 3, portions (b), (c), or (d) depending on a photosensitivity of a material being cured. In various embodiments, the curing step (e.g., step 1204 of method 1200 or step 1306 of deposition cycle 1300) can comprise heating instead of exposure of light, or any other curing process known in additive manufacturing. The present disclosure is not limited in this regard. In various embodiments, each of the one or more light sources is configured to emit light having an average wavelength that is between 10 nm and 400 nm. In this regard, each of the one or more light sources can be configured to emit light having a wavelength associated with ultraviolet light.

In various embodiments, the method 1200 from FIG. 12 further comprising generating the sound field prior to forming the three-dimensional printed structure. In various embodiments, the generating the sound field comprises activating a plurality of ultrasonic transducers (e.g., as shown in FIG. 5). In various embodiments, a first transducer array can be spaced apart from a second transducer array. In various embodiments, the first transducer array can be aligned toward the second transducer array, and the second transducer array can be aligned toward the first transducer array. In this regard, the sound field can be generated between the first transducer array and the second transducer array.

In various embodiments, in response to the depositing the initial drop of material into the sound field, the initial drop of material is suspended within the sound field (e.g., as shown in FIG. 5).

In various embodiments, the previously cured drop of material is selected from any of a plurality of previously cured drops of material. For example, with references to FIG. 5, although each drop of material is illustrated as being secured to the prior cured drop of material, the present disclosure is not limited in this regard. For example, a next drop of material could be cured to any of the previously cured drops of material and still be within the scope of this disclosure.

Figure 13:
FIG. 13 illustrates a deposition cycle in the method of FIG. 12, in accordance with various embodiments.
Figure 13:
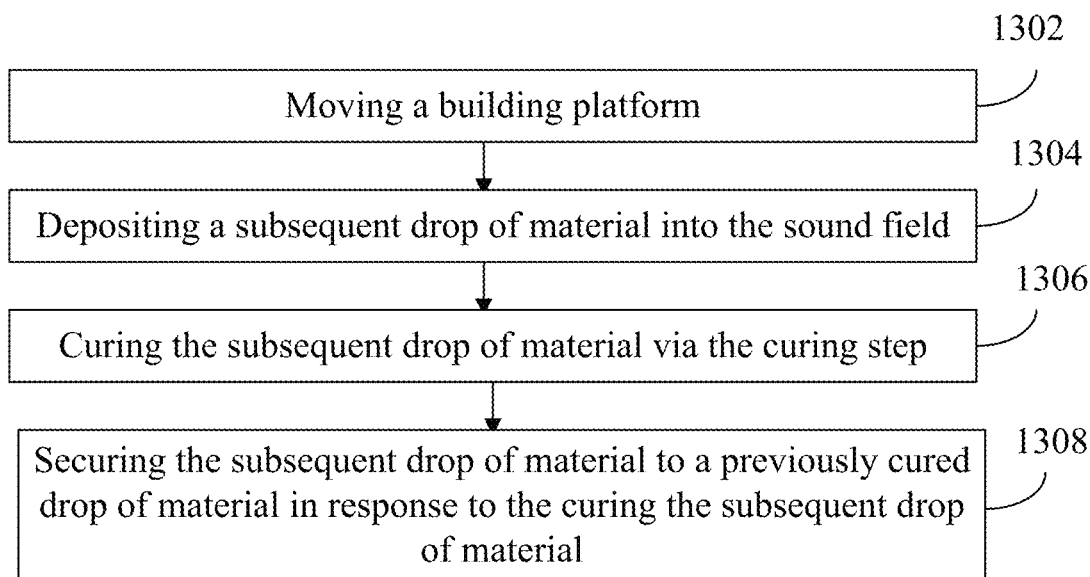

In various embodiments, the deposition cycle 1300 from FIG. 13 for at least one of the subsequent drops of material comprises manipulating the subsequent drop of material prior to the curing step (e.g., step 1306). In various embodiments, the manipulating the subsequent drop of material comprises modulating an acoustic pressure of the sound field. In various embodiments, the modulating the acoustic pressure of the sound field comprises increasing the acoustic pressure to modify a shape of the subsequent drop of material to be generally convex. In various embodiments, the modulating the acoustic pressure of the sound field further comprises decreasing the acoustic pressure to modify a shape of the subsequent drop of material to be generally concave. In various embodiments, the manipulating the subsequent drop of material further comprises extruding an interior drop of material into the subsequent drop of material prior to the curing step. In various embodiments, the interior drop of material is enclosed entirely by the subsequent drop of material after the curing step.

Figure 14:
FIG. 14 illustrates a method of forming an artificial cell structure, in accordance with various embodiments.
Figure 14:
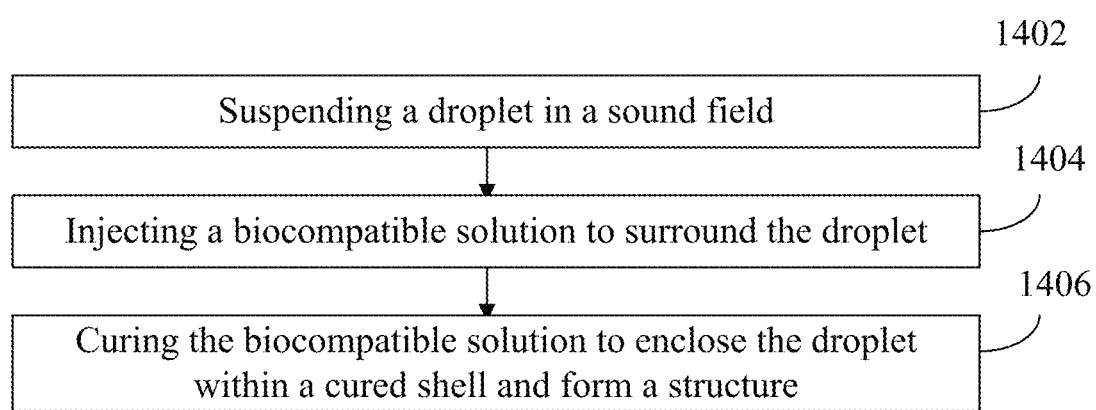
Figure 15:
FIG. 15 illustrates a method of forming an artificial cell structure, in accordance with various embodiments.
Figure 15:
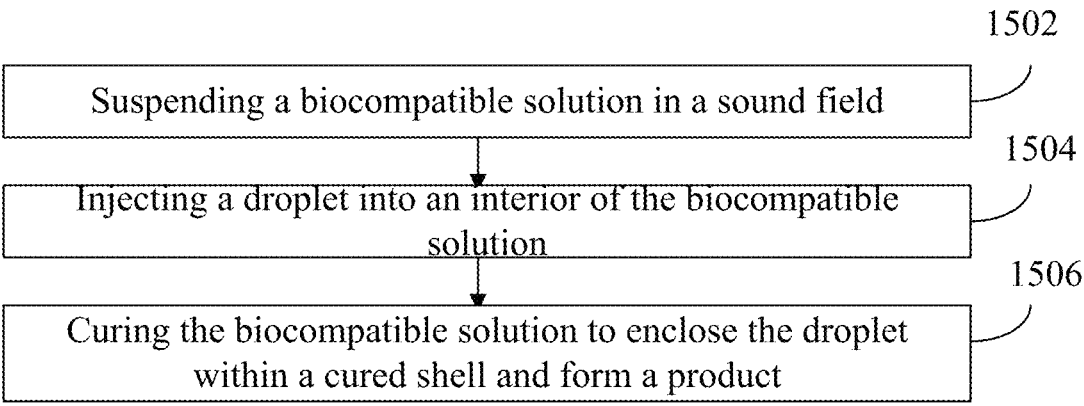

Referring now to FIG. 14, a method 1400 that can be utilized for encapsulating a drug or forming a microenvironment for one or more active cells is illustrated, in accordance with various embodiments. In various embodiments, the method 1400 comprises suspending a liquid droplet (e.g., a liquid drug, a culture medium with one or more active cells, or the like) in a sound field (step 1402), injecting a biocompatible solution to surround the droplet (step 1404), and curing the biocompatible solution to enclose the droplet within a cured shell and form a structure (e.g., an encapsulated drug, a microenvironment for studying one or more active cells, or the like). In various embodiments, alternatively to method 1400, a method 1500 that can be utilized for encapsulating a drug or forming a microenvironment for one or more active cells is illustrated in FIG. 15, in accordance with various embodiments. In various embodiments, the method 1500 comprises suspending a biocompatible solution in a sound field (step 1502), injecting a droplet (e.g., a liquid drug, a culture medium with one or more active cells, or the like) into an interior of the biocompatible solution (step 1504), and curing the biocompatible solution to enclose the droplet within a cured shell and form a structure (e.g., an encapsulated drug, a microenvironment for studying one or more active cells, or the like). Accordingly, the droplet can be injected into the biocompatible solution prior to curing in accordance with method 1500 or the droplet can be deposited into a sound field first and then surrounded by a biocompatible solution in accordance with method 1400. The present disclosure is not limited in this regard.

In various embodiments, each of the one or more active cells for a microenvironment is capable of a transport of molecules that require the use of energy, in the form of an energy-storing chemical called adenosine triphosphate (ATP).

In various embodiments, responsive to the curing in step 1406 (or step 1506), the droplet remains a liquid that is enclosed entirely by the cured shell. In various embodiments, the curing in step 1406 (or step 1506), further comprises exposing the biocompatible solution to one or more light sources (e.g., as discussed with respect to step 1204 of method 1200 and step 1306 of deposition cycle 1300).

In various embodiments, each of the method 1400 and method 1500 can further comprise generating the sound field prior to suspending the droplet. In various embodiments, the generating the sound field comprises activating a plurality of ultrasonic transducers wherein the plurality of ultrasonic transducers includes a first set of ultrasonic transducers spaced apart from a second set of ultrasonic transducers. In various embodiments, the liquid droplet is suspended between the first set of ultrasonic transducers and the second set of ultrasonic transducers after performing step 1402. In various embodiments, both the liquid droplet and the biocompatible solution are suspended between the set of ultrasonic transducers prior to and during the curing in step 1406 and/or step 1506. In various embodiments, the biocompatible solution comprises a poly(ethylene glycol) diacrylate (PEGDA) solution. In various embodiments, the suspending the droplet in the sound field comprises dispensing the droplet in a low-pressure area of the sound field.

In various embodiments, when forming an encapsulated drug, the cured shell can be configured to dissolve in a strong acid or alkali environment. In various embodiments, an amount of the biocompatible solution utilized in step 1402 of method 1400 or step 1504 of method 1500 can correspond to a predetermined amount based on a desired thickness for a cured shell. In this regard, the desired thickness can correspond to a specific location in an intestinal tract where the cured shell is dissolved to release the drug droplet in response to consumption of the drug by a user.

Figure 16:
FIG. 16 illustrates a method of forming a multi-shell concentric structure, in accordance with various embodiments.
Figure 16:
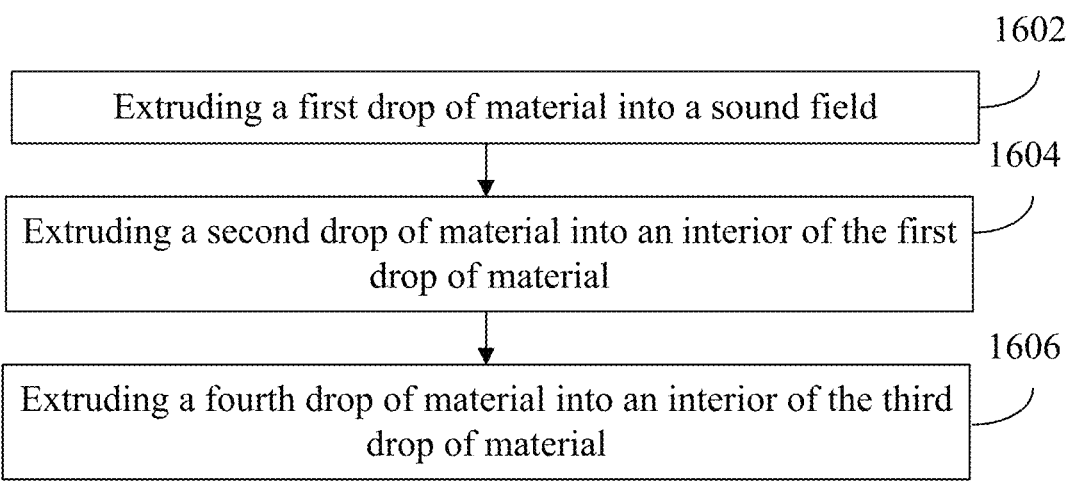

Referring now to FIG. 16, a method 1600 for manufacturing multi-shell structures that involves an ultrasonic suspension device and a multi-nozzle extrusion system with aligned needle tips is illustrated in accordance with various embodiments. In various embodiments, the method 1600 can provide the ability to create complex and intricate structures. It has potential applications in various fields, such as biomedical engineering and nanotechnology, in accordance with various embodiments. In various embodiments, the method 1600 is for additively manufacturing a multi-shell structure.

With combined reference to FIGS. 7 and 16, the method 1600 can comprise extruding a first drop of material into a sound field, the first drop of material levitating within the sound field in response to being released into the sound field (step 1602), and extruding a second drop of material into an interior of the first drop of material (step 1604). The first drop of material and the second drop of material can each be deposited from a separate and distinct extrusion device. In this regard, the first drop of material can be a different material relative to the second drop of material.

In various embodiments, the method 1600 further comprises extruding a third drop of material into an interior of the second drop of material (step 1606). The third drop of material can be deposited from a separate and distinct extrusion device relative to the first drop of material and the second drop of material. In this regard, the third drop of material can be a different material relative to the second drop of material and the first drop of material.

In various embodiments, the method 1600 further comprises extruding a fourth drop of material into an interior of the third drop of material (step 1608). The fourth drop of material can be deposited from separate and distinct extrusion device relative to the first drop of material, the second drop of material and the third drop of material. In this regard, the fourth drop of material, the third drop of material, the second drop of material, and the first drop of material can all be different materials. However, the present disclosure is not limited in this regard. For example, in various embodiments, some of the drops of material deposited may be a similar (or a same) material as another drop of material. The present disclosure is not limited in this regard.

In various embodiments, in response to the extruding the first drop of material into the sound field, a needle tip of an extrusion device for the second drop of material is covered by the first drop of material. In various embodiments, in response to the extruding the second drop of material into the sound field, a needle tip of an extrusion device with a third drop of material is covered by the first drop of material and the second drop of material. In various embodiments, extruding a third drop of material into the interior of the second drop of material can be done through the extrusion device with the third drop of material therein.

In various embodiments, the method 1600 can be performed with two or more extrusion devices to form new material deposited within a previously extruded material, ultimately resulting in a concentric shell structure that is multi-material and multi-layered.

Experimental Results

As described further herein, various experiments were conducted in accordance with the below disclosure. The experiments were performed for the purpose of validating capabilities of the systems, methods, and devices disclosed herein. In no way are the experimental results outlined below intended to limit this disclosure in any manner.

In various embodiments, an exemplary non-photosensitive material was prepared by vortex mixing approximately 5 wt % iron oxide and 1 wt % Irgacure 819 photoinitiator with a polymer (e.g., polyethylene glycol diacrylate (PEGDA)) for approximately five minutes. As described further herein, a photocuring process utilized for the non-photosensitive material can include a TBS illumination strategy.

In various embodiments, an exemplary semi-photosensitive material can comprise an elastic resin (e.g., flexible 80A material or any other elastic resin known in the art of three-dimensional (3D) printing). In various embodiments, the semi-photosensitive material was formed by mixing the elastic resin with approximately 0.1% of a dye (e.g., a red oil dye or any other type of dye known in the art). As described further herein, a photocuring process utilized for the semi-photosensitive material can include a TBS+TB illumination strategy.

In various embodiments, an exemplary photosensitive material was prepared by vortex mixing approximately 10 wt % iron oxide and 1 wt % Iragacure 819 photoinitiator with PEGDA for approximately five minutes. Another exemplary photosensitive material could be prepared by vortex mixing PEGDA with 1 wt % Irgacure 819 photoinitiator for approximately five minutes.

A levitations device can comprise a plurality of ultrasonic transducers, a controller, a dual motor drive, and a DC power adapter. For example, one such levitation device is a multi-emitter single-axis acoustic levitator available at Makerfabs headquartered in Shenzhen, Guadong, China. In various embodiments, two sets of transducers, each transducer in the sets of transducers with a diameter of approximately 10 mm can be fixed on a frame of the levitation device. Each set of transducers can be arranged in three concentric circles on a hemispherical sphere. Transducers vibrate at a frequency of 40 kHz under the action of a high-frequency electrical signal applied by the driver, and then two sets of opposite hemispherical transducer arrays form standing waves in space, which are the positions corresponding to the droplets (or material) that can be suspended.

Figure 10B:
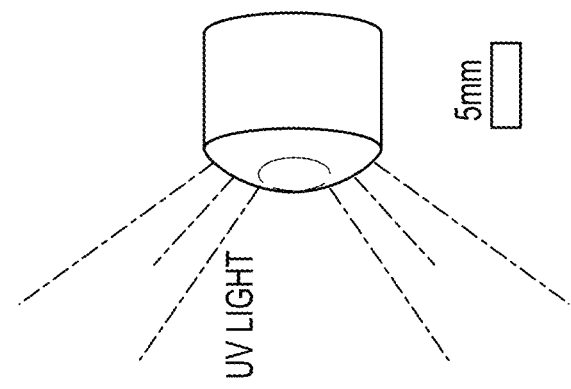
FIG. 10B illustrates an acoustic levitation fluorescent droplet array under UV light, in accordance with various embodiments.
Figure 10B:
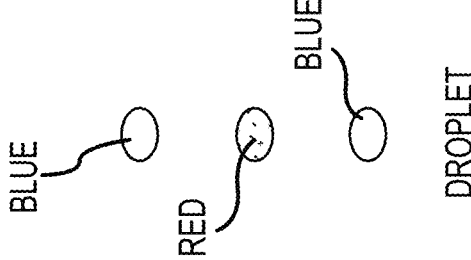
Figure 10A:
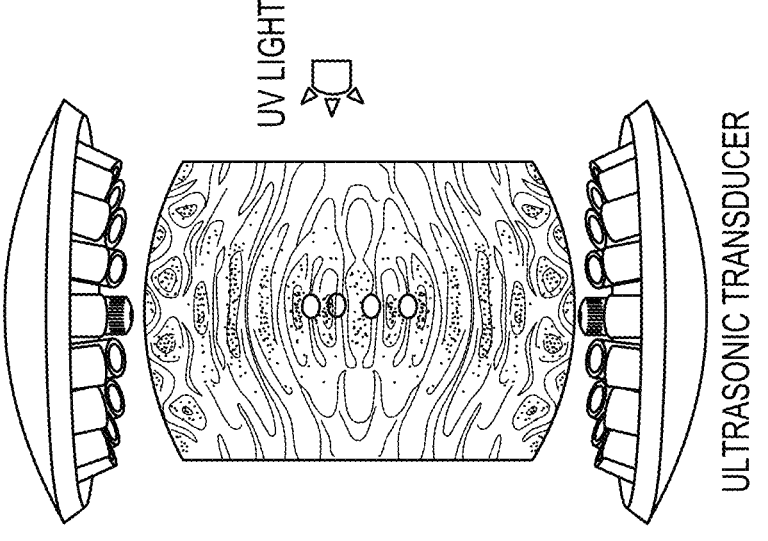
FIG. 10A illustrates an ALCDP process set-up and simulation of acoustic field distribution, in accordance with various embodiments.
Figures 10C, 10D:
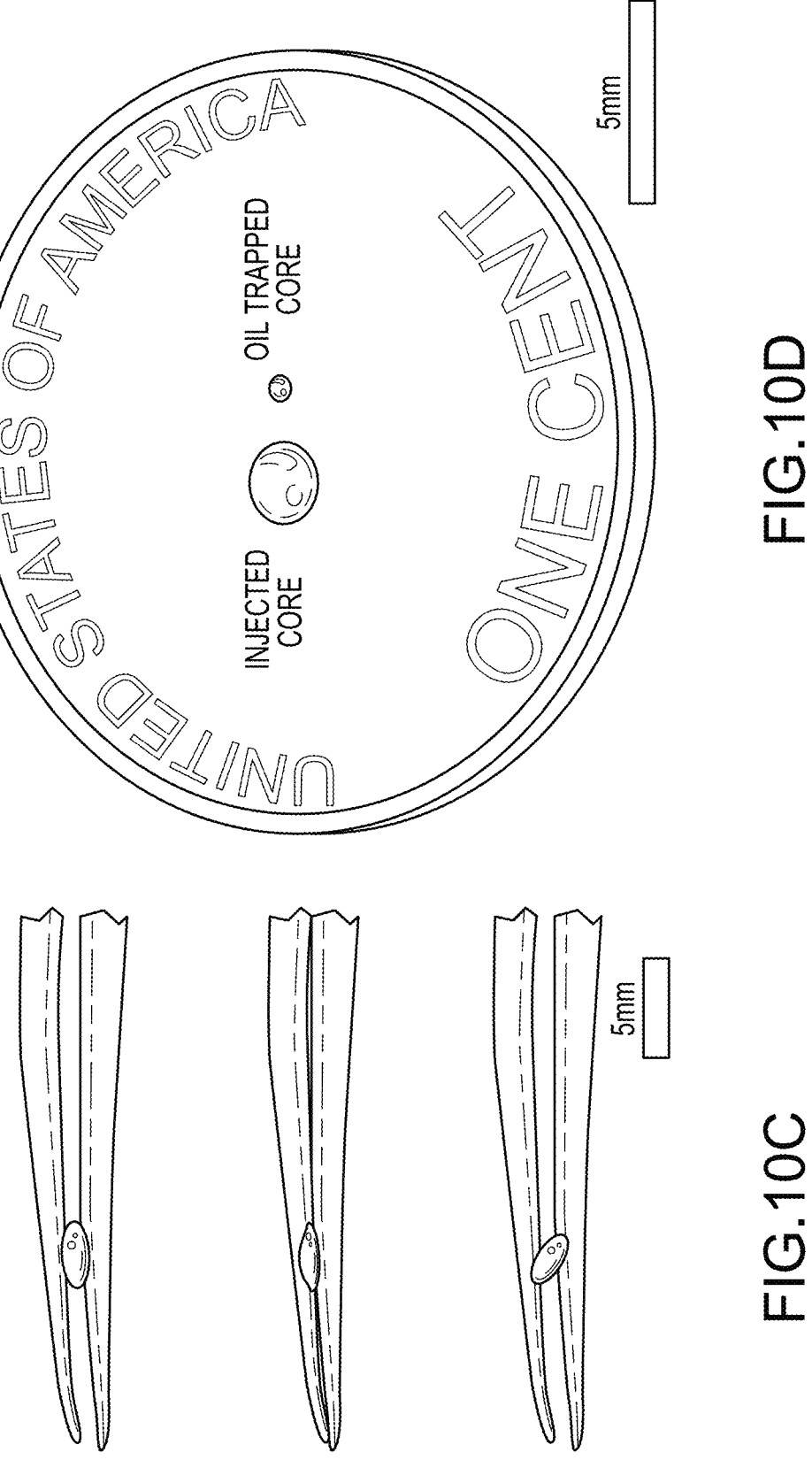
FIG. 10C illustrates a high deformation rate and recoverability of a thin shell structure, in accordance with various embodiments.
FIG. 10D illustrates a solidified extruded core and oil trapped core compared to a dimension of a penny.
Figures 10E, 10F:
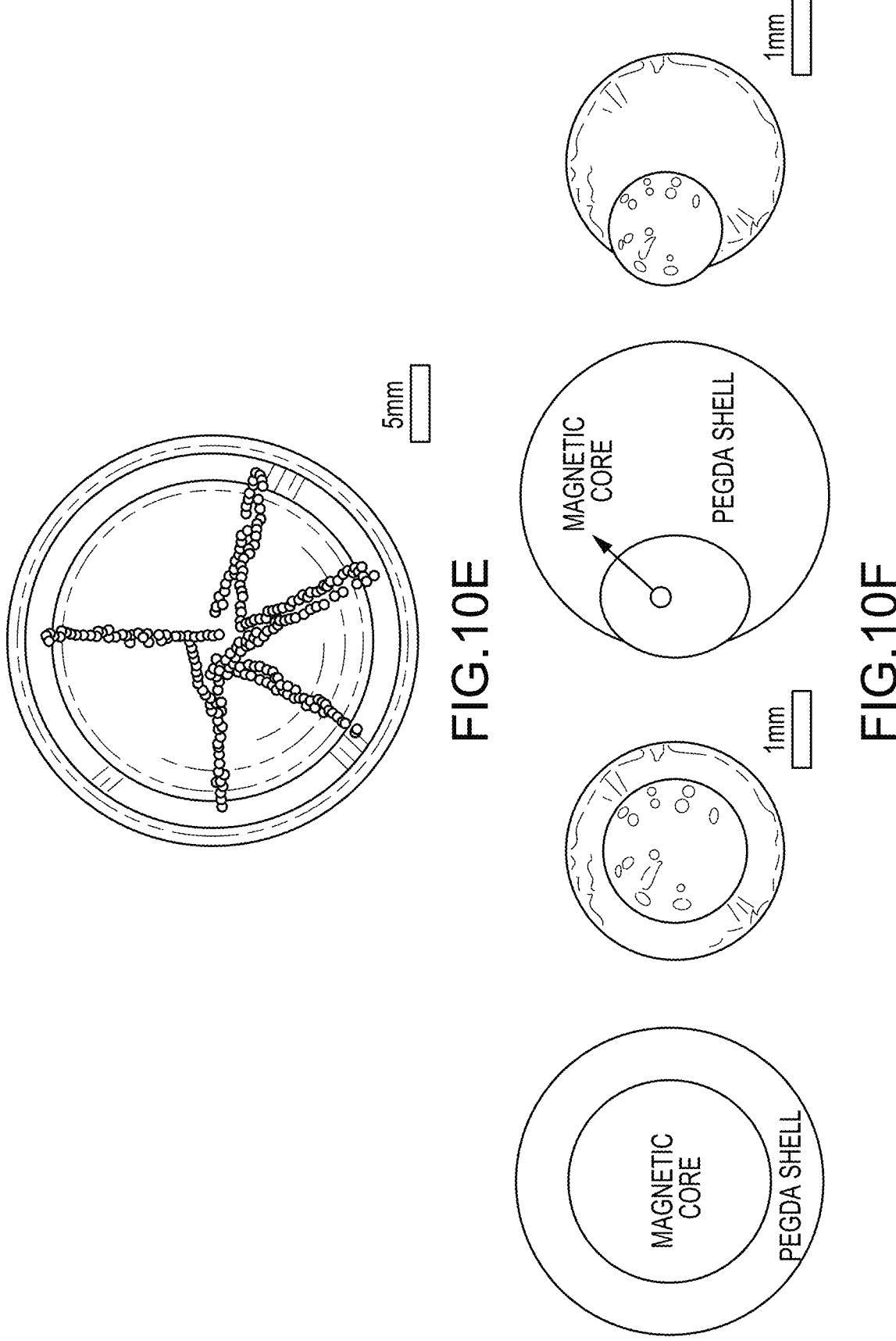
FIG. 10E illustrates a trajectory of a magnetically driven center-offset cell structure with a magnetic core in water, in accordance with various embodiments.
FIG. 10F illustrates a demonstration of center and center-offset magnetic cell structure and fabrication results, in accordance with various embodiments.
Figures 11A, 11B:
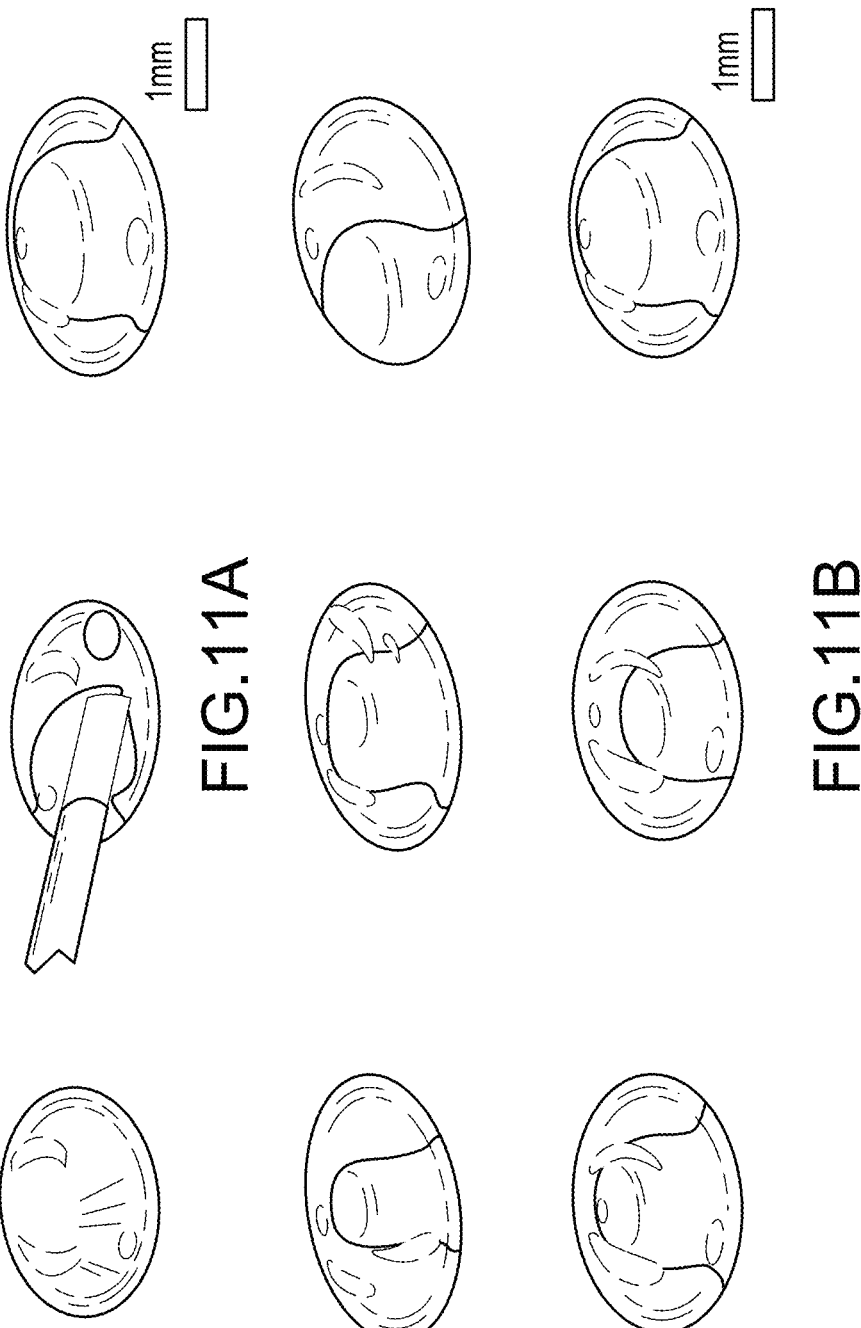
FIG. 11A illustrates a flow of dye core trapped in a suspended oil droplet, in accordance with various embodiments.
FIG. 11B illustrates oil droplets with mononuclear dye core, in accordance with various embodiments.
Figures 11C, 11D:
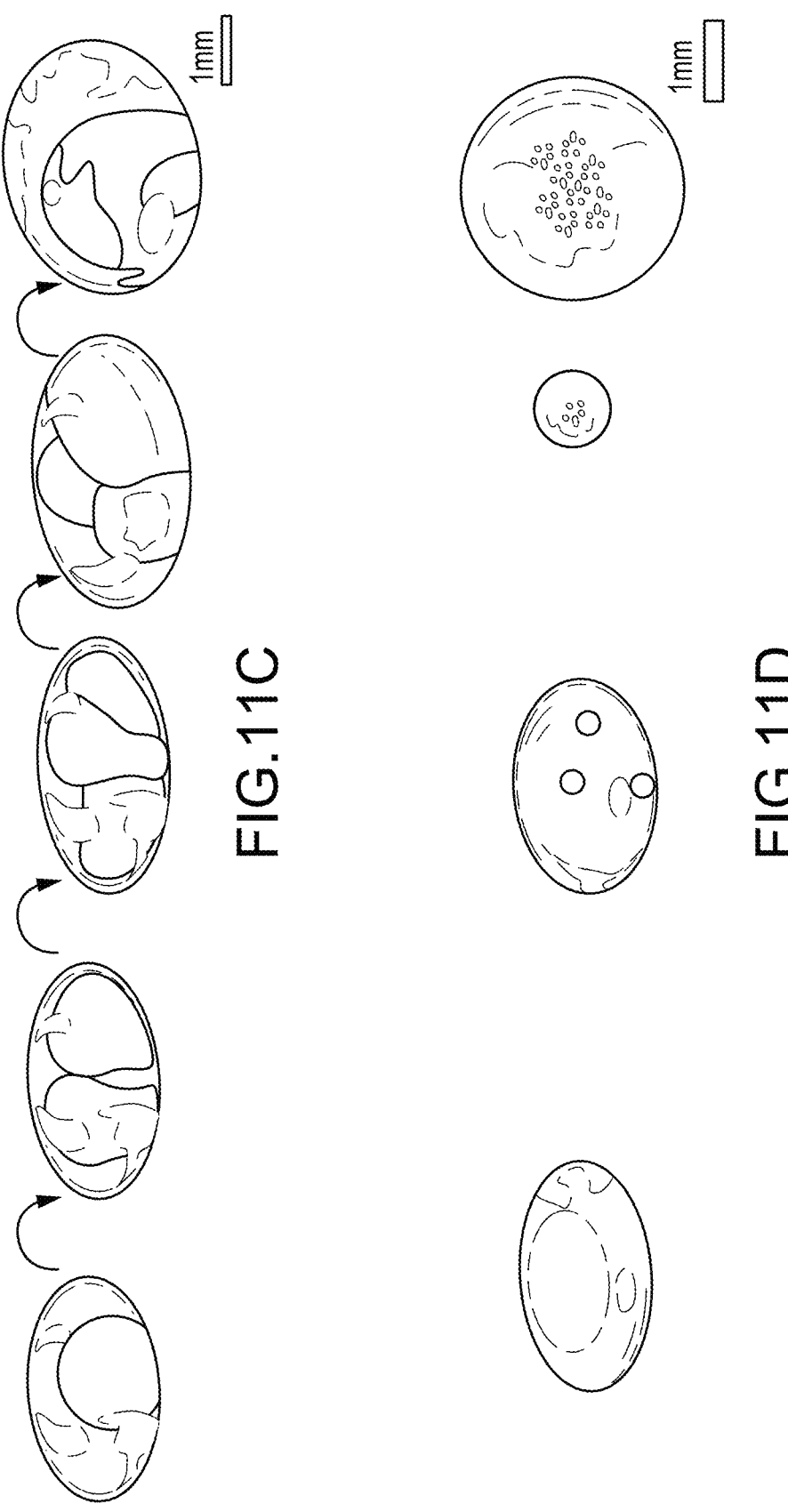
FIG. 11C illustrates a process of injecting different dye cores into oil droplets, in accordance with various embodiments.
FIG. 11D illustrates oil trapping-based fabrication of submillimeter scale magneto-nucleated structure, in accordance with various embodiments.
Figure 11E:
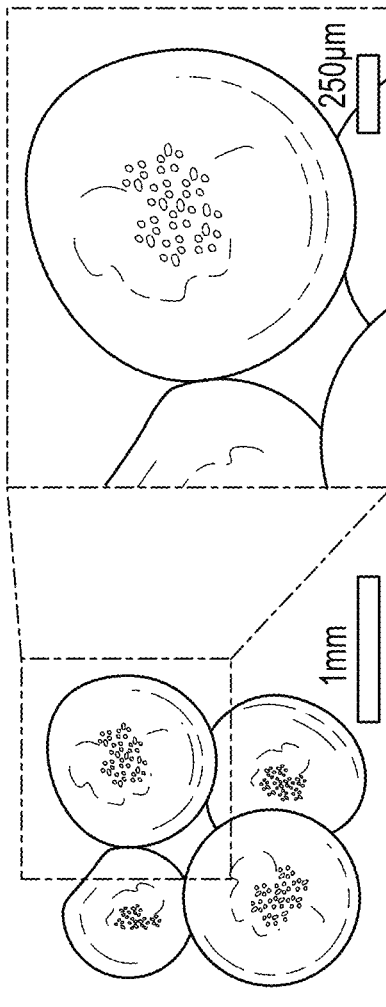
FIG. 11E illustrates multiple magnetic nuclei trapped by oil droplets without fusion, in accordance with various embodiments.
Figure 11E:
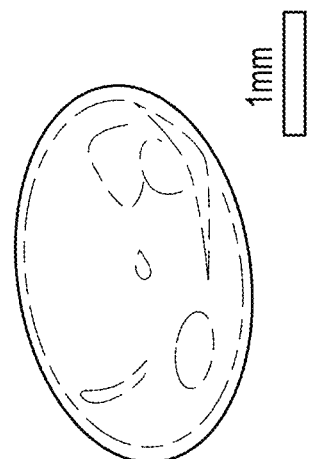

In terms of experimental operation, the droplet is extruded from an extrusion device (e.g., a needle) and hangs on the top of the needle under the constraints of surface tension, and then the droplet is slowly moved into the standing wave point (low-pressure area, as shown in the bright yellow region of FIG. 10a) of the ultrasonic field. After slowly removing the needle, the droplet is trapped in the low-pressure area and the contact surface between it and the needle is necked and fractured. Finally, it is stably suspended in the air. In the fabrication of a single-core cell structure, the base droplet is first suspended in the air, and then a hemispherical dye or magnetic solution at the tip of the needle is inserted into the base droplet. The second solution is trapped inside the base droplet after the needle is removed. A multi-core cell structure can be obtained by repeating this step.

The simulations of the acoustic field and droplet oscillation morphology were conducted via COMSOL Multiphysics 5.6. Pressure Acoustics, Frequency Domain interface and Particle Tracing for Fluid Flow Interfaces are used to simulate the acoustic field and droplet oscillation morphology, respectively. A two-dimensional region is selected with the upper and lower ends of a circular curve and the left and right edges of a vertical line. The boundary of the curve is divided into odd parts and each segment is given the characteristics of high-frequency vibration at intervals to simulate the transducer's characteristics. The other boundaries are set as sound hard boundaries, and the material inside the area is set as air. After calculation, the spatial distribution map of the ultrasonic field is obtained (FIG. 10a), and the sound pressure distribution is determined by:

$$\begin{cases} \nabla \cdot \left( -\frac{1}{\rho_c} \nabla p_t - q_d \right) - \frac{k_{eq}^2 p_t}{\rho_c} \\ p_t = p + p_b \\ k_{eq}^2 = \left( \frac{\omega}{c_c} \right)^2 - k_x^2 \end{cases} \quad \text{Eq. (1)}$$

where $\rho_c$ is the quiescent density, $p_t$ is the total pressure, $q_d$ is the dipole domain source, $k_{eq}$ is the wave number, $Q_m$ is the monopole domain source, $p_b$ is the background pressure, $\omega$ is the angular frequency, $c_c$ is the speed of sound, and $k_z$ is the out of plane wave number.

The droplets (or particles) are subjected to acoustophoretic radiation force, gravity force, and drag force in the acoustic field and remain suspended in the air in equilibrium. When the low-frequency modulation wave is superimposed on the ultrasonic wave with a frequency of 40 kHz, the acoustophoretic radiation force fluctuates periodically and the force balance of the droplet is broken and oscillation occurs. The shape of the droplet changes from an ellipsoid to a complex pattern with varying numbers of nodes. The force F and vibration state of the droplet are respectively determined by the following three parts:

$$F = F_{rad} + F_g + F_D = \frac{d(m_p v)}{dt} \quad \text{Eq. (2)}$$

where $F_{rad}$ is the acoustophoretic radiation force, $F_g$ is the gravity force, $F_D$ is the drag force, $m_p$ is the particle mass, and v is the particle velocity. Accordingly, $$\begin{cases} F_{rad} = V_p \left[ f_1 \frac{1}{2\rho c^2} \langle p^2 \rangle - f_2 \frac{3}{4} \rho \langle v^2 \rangle \right] \\ f_1 = 1 - \frac{K_0}{K_p}, f_2 = \frac{2(\rho_p - \rho)}{2\rho_p + \rho} \end{cases} \quad \text{Eq. (3)}$$

where $V_p$ is the particle's volume, $f_1$, $f_2$ are the monopole and dipole scattering coefficients, respectively, $\rho$ is the density of air, c is the speed of sound, p is the acoustic pressure, v is the acoustic velocity, $K_0$, $K_p$ are the bulk moduli, and $\rho_p$ is the particle density.

$$F_g = m_p g \frac{\rho_p - \rho}{\rho_p} \quad \text{Eq. (4)}$$

where $m_p$ is the particle mass, g is the gravitational acceleration, $\rho$ is the air density, and $p_\rho$ is the particle density.

$$\begin{cases} F_D = \frac{1}{\tau_p} m_p (u - v) \\ \tau_p = \frac{\rho_p d_p^2}{18\mu} \end{cases} \quad \text{Eq. (5)}$$

where $\tau$ is the diffusion coefficient, u is the acoustic velocity, v is the particle velocity, $\rho_p$ is the particle density, $d_p$ is the particle diameter, and $\mu$ is the air dynamic viscosity.

To test the motion of magnetic particles in the magnetic field, a microfluidic channel made of standard translucent photopolymer resin shaped (the ASU logo) was printed. The center-offset magnetic cells are first suspended on the liquid surface inside the channel, and then change the position of the magnet around the channel to drive the magnetic cells to move along the channel. Similarly, the magnetic cells are suspended in water filled the glass tank. When a magnet is close to the tank, the magnetic cells move to the edge of the tank under the action of magnetic force. A process of directional movement of magnetic cells is recorded to track the motion. The video is converted into a series of single-frame pictures at different time slots after being imported into ImageJ. The pictures then need to be converted into grayscale images before using the Manual Tracking function. By selecting the target particles one by one, the particle positions at all times can be labeled, and finally, the movement trajectories of the particles can be obtained by over-laying these points to the last frame.

As shown in FIG. 10, portion a, the transducers are placed on two horizontally opposed hemispherical frames, and ultrasonic waves generate high-pressure and low-pressure regions in the space as shown in the simulation of the acoustic field map, where the particles are suspended in the low-pressure regions. The node position of the standing wave is represented through the fluorescent droplets. Two different fluorescent dyes are vertically arranged in the air, emitting blue and red light when excited by UV incident light (FIG. 10*b*). Controllable suspension of droplets and irradiation of UV light are necessary to levitate and cure photosensitive resins. By adjusting the exposure time and the components of the photosensitive mixture, fully cured droplets or spherical shell structures with different thick-nesses can be obtained. Compared with pure PEGDA with 1 wt % Irgacure 819 photoinitiator, the curing characteristics of PEGDA mixed with 5 wt % iron oxide and 1 wt % Irgacure 819 photoinitiator indicates its low light penetration depth. Hence, it can be cured to form a thin shell structure, which has large deformation characteristics and can be completely flattened and restore the original shape for many times (as shown in FIG. 10*c*). In addition, it was found that when the droplet is directly extruded and suspended with a syringe, it could be trapped at the node only when the volume of the droplet increased to a certain extent (e.g., 1.5-3 mm in diameter) due to the restraint of surface tension as the droplet separated from the needle.

The oil droplet encapsulation method as described previ-ously herein can effectively reduce the size of photosensitive resin droplets (300-800 μm), which provides the possibility for subsequent encapsulation of multilayer structures. At the same time, the solidified droplet cells containing the mag-netic cores can achieve intricate motions driven by the magnetic force. For example, the movement in the ASU channel, balance under the action of various force fields, and the magnetic actuation and autonomous reset shown in FIG. 10*e*. The magnetic nucleus cell structure in the FIG. 10*e* floats on the liquid surface against gravity under the action of the surface tension and buoyancy of the liquid. When the magnet approaches, the magnetic nucleus cells move away from the lower central area of the liquid level to the higher liquid level under the action of the magnetic force. After removing the magnet, the magnetic nucleus cells automati-cally return to the central area, and the corresponding driving trajectory can be obtained by repeating this cycle. Inspired by the concept of artificial cells, transparent PEGDA was used to encapsulate the magnetic cores to obtain multilayer structures with outer shells and inner cores after fabricating smaller magnetic cores, such as the core-centered and biased cell structure in FIG. 10*f*. Specifically, the magnetic droplet was first extruded to solidify as the inner core, and then the PEGDA solution was extruded to coat the inner core. As the droplet was rotated in the acoustic field, the inner core was biased to the edge under the action of centrifugal force (as shown in the right image of 1*f*). Since the PEGDA700 has lower viscosity (130 cP), it is still possible for the core to be placed in the core of the structure (as shown in the left image of 10*f*), while the core cannot be centered at all when using 80A (1260 cP) to coat the core.

The droplet is suspended in the air by a 40 kHz ultrasonic wave and keeps the shape of an ellipsoid. When the modu-lation wave is superimposed on the ultrasonic wave, the intensity of the sound field will fluctuate, which cause the droplet to shake and deform. The shapes with different nodes can be obtained by controlling the frequency of the modu-lation wave. As shown in the simulation results in FIG. 2, the droplet has three sharp corners (3 nodes) at 10 Hz, and the node of the droplet gradually increases with the increase of the modulation wave frequency. For example, the droplet has 8 nodes at 890 Hz. The diameter and resonance fre-quency of the droplet under the modulation wave are deter-mined by the Rayleigh equation:

$$f_R = \frac{1}{2\pi}\sqrt{\frac{\sigma}{\rho R^3}l(l-1)(l+2)} \qquad \text{Eq. (6)}$$

where σ is the surface tension, ρ is the density of the droplet, R is the droplet diameter, and l is the oscillation mode.

Theoretically, the higher the resonant frequency, the smaller the diameter under the same oscillation mode. The larger the oscillation mode value, the larger the diameter at the same resonant frequency. The effect of modulation wave on the suspended droplet is not only the change of shape, but also the convection inside the droplet. The larger the defor-mation scale of the droplet, the faster the corresponding internal convection velocity. For example, the convection velocity at 230 Hz is several meters or tens of meters per second, while the deformation of the 890 Hz droplet is much smaller and the internal convection is extremely slow. Therefore, convection inside the droplet can be manipulated through control of the resonant frequency, which provides an efficient platform for mixing materials at the microscale.

Using photocurable materials, droplets can not only levi-tate under the sound field, but also solidify with controlled exposure time to obtain specific structures. Combined with magnetic materials, a drivable cell-like structure is fabri-cated with the ability to move directionally within complex channels. For light-sensitive materials, the curing character-istics are homogeneous, and the curing depth is logarithmi-cally proportional to the input energy. The relationship between the curing depth of PEGDA solution and energy input is given by the Beer-Lamber's equations:

$$C_d = d_p \ln\left(\frac{E_{max}}{E_c}\right) \qquad \text{Eq. (7)}$$

where $d_p$ is the penetration depth of light into a photo-curable PEGDA solution after a reduction in irradiation of 1/e. $E_{max}$ is the peak energy of light illuminating on the photocurable PEGDA solution, and $E_c$ is the mini-mum energy for the photocurable PEGDA solution to be solidified.

The curing property of the PEGDA and iron oxide mix-ture are not as sensitive as the pure photocurable PEGDA.

The curing depth decreased due to the light-shielding properties of the iron oxide particles. The curing property of the mixture can be determined by Griffith and Halloran's equation:

$$C_d = \left(\frac{\eta}{\eta_p - \eta}\right)\frac{\lambda^2}{a} \ln\left(\frac{t}{t_c}\right)\frac{1}{\varphi} \qquad \text{Eq. (8)}$$

where $\eta$ and $\eta_P$ are the refractive indexes of the PEGDA and iron oxide particle, respectively, $\lambda$ is the wavelength of incident light, a is diameter of the iron oxide particles, t and $t_c$ is the exposure time and critical exposure time respectively, and $\varphi$ is the concentration of iron oxide particles.

Intrinsically, droplet suspensions are suitable for the fabrication of spheres, disks and shell structures. When the droplet is fully solidified, the shape of the solid is determined by the droplet's volume and surface tension. The smaller the droplet, the closer the solidified entity is to a sphere. On the contrary, the droplet is in a disc structure under the compression of the sound field and the action of centrifugal force. If the volume of the liquid continues to increase, the surface of the droplet ruptures, and the droplet is unbalanced and splashes around under the action of centrifugal force and acoustophoretic radiation force. FIG. 3a shows the process of solidifying the shell in this study. First, the PEGDA droplets containing the photoinitiator are extruded and gathered at the tip of the needle under the action of surface tension, and then the tip of the needle is placed in a low-pressure sound field. When the needle is removed from the acoustic field, the droplet is trapped in the low-pressure area. Once the droplet volume is sufficient, the contact surface between the droplet and the needle is necked and broken, and finally suspends in the nodes. If the volume of the droplet is too small, it escapes from the low-pressure area under the pulling of the needle and cannot achieve independent suspension. The photocuring process is then initiated by controlling the UV light sources (FIG. 10a) on the top, bottom and sides of the device. The irradiation time is also precisely controlled to avoid the droplets being completely solidified or the top and bottom of the droplets not being cured due to insufficient light intensity. The cross-sectional view of the sample in FIG. 3a demonstrates the feasibility of fabricating shells by combining ultrasonic suspension droplets and photocuring. The curing characteristics and corresponding curing strategies of different materials were further analyzed.

The material in FIG. 3, portion b is PEGDA with 5 wt % iron oxide and 1 wt % Irgacure 819 photoinitiator. The large amount of iron oxide absorbs the incident light and reduces the penetration depth of light, which helps solidify the shell structure without fully solidifying as easily as pure PEGDA. In this regard, the TBS illumination strategy is used to fabricate the shell structure. The stronger UV light on the side cures the side of the droplet but is not enough to cure the top and bottom of the droplet, so the weaker light source at the top and bottom aids in solidifying the upper and lower areas of the droplet. Finally, a shell structure with droplets inside as shown in FIG. 3b-2 is obtained, and the sides of the shell are significantly thicker than the upper and lower regions as shown in the cross-sectional view in FIG. 3, portion b-3. By measuring the mean value of the shell thickness, the relationship between the thickness and the illumination time in FIG. 3, portion b-4 is obtained. The shell thickness increases steadily from 45 μm at 10 s to 160

μm at 90 s with increasing illumination time. Subsequently, the shell thickness no longer increases significantly even with continued illumination because the incident light is absorbed by the iron oxide and cannot penetrate deeper into the droplet. It is worth noting that when the illumination time is less than 10 s, the bottom and top regions of the droplet are not completely cured, and finally only a hollow ring structure or a semi-cured colloidal state can be formed.

For light-sensitive materials, light from the side causes the suspended droplets to solidify rapidly, making it difficult to fabricate thin shell structures. Therefore, a strategy of TB lighting is chosen when using the easily photocurable Flexible 80A material in FIG. 3, portion c. Since the material is transparent, the areas on the left and right edges of the droplets are also prone to curing. Due to the excellent elasticity of the material, the thin shell structure containing the uncured liquid in FIG. 3 portion c-2 can recover its original shape without cracking and leaking even after being subjected to large-scale compressive deformation. The cross-sectional view of the thin shell structure in FIG. 3 portion c-3 exhibits good thickness uniformity. As shown in FIG. 3 portion c-4, the shell thickness gradually increased from 50 μm at 45 s to 130 μm at 75 s, and then if the illumination time continued to increase to 90 s, the thickness would sharply increase to a value of 360 μm, which is due to the complete solidification of the droplets. In addition, when the illumination time is less than 45 s, the energy input of UV light is not enough to solidify the droplets, and the droplets still maintain a colloidal state without a thin shell outer layer.

When the solidification characteristics of the liquid are between sensitive and semi-sensitive states, both the TBS and TB strategies described above are no longer applicable, where TBS makes the left and right edges of the droplet solidify too thick, and TB cannot effectively solidify the left and right edges. Therefore, through a proper combination of TBS and TB irradiation time, the upper and lower regions of the droplet can be effectively cured while controlling the curing thickness of the left and right edges to avoid over-curing and under-curing. We found that the droplet surface was completely solidified to form a thin shell structure when the TBS and TB times were 45 s and 180 s respectively as shown in FIG. 3, portion d-2,3, whose corresponding thickness was 100 μm. As a result, illumination strategies can be tailored for materials with different photocurable properties, which provide an effective means to precisely control shell thickness and enable more complex mono- and/or multi-layer printing, in accordance with various embodiments.

Furthermore, fabrication of single-core or multi-core structures based on oil trapping was analyzed for fabricated artificial cells that may have low structural complexity, but large droplet sizes that can potentially cause issues. The specific steps for artificial cell formation as described previously herein are to first suspend the oil droplets, then insert a needle containing a water-soluble dye into the oil droplet to inject the dye, and finally slowly withdraw the needle to ensure oil/dye droplet is still in the low-pressure region (FIG. 11, portion a). The dyes are phase-separated from the oil droplets under the coating of the hydrophilic group of the oil droplets and are not mutually miscible, and the two are independently and stably suspended in the air. Similarly, oil/dye structures with different color cores are obtained by replacing different dyes (FIG. 11, portion b). To further demonstrate the versatility of the oil trapping method, dyes with different colors were simultaneously injected into oil droplets to form multinucleated structures as shown in FIG. 11, portion c. Since the volume of oil droplets that can be suspended in the acoustic field is determined by the power and frequency of ultrasound transducers, the injecting volume of dyes is limited when fabricating a multi-core structure (FIG. 11, portion b). The volume of different dyes added each time needs to be precisely controlled to achieve multi-core architecture. It can be found that when a single core or a double core is injected, the cores can still well maintain the spherical structure, and does not fuse with the help of the oil membrane coating. After adding to three cores, the inner core structure is deformed due to the limited space inside the droplet, and the dye boundaries contact, squeeze, and deform with each other. In the penta-core structure, the dyes are almost mixed, and the boundaries are completely fitted. But the oil membrane does not allow the exchange of different dyes and maintains a clear curved boundary.

In order to solve the defects of excessively large volume and flat shape of directly injected droplets, the photocurable material can be injected into the oil droplets to form nearly spherical droplets with the size of hundreds of microns. As shown in FIG. 11, portion d, the size of the spheres fabricated by oil trapping is 3 times smaller than that of the injected droplets, and the diameter can be reduced by an order of magnitude by controlling the droplet volume in the experiments. After successful solidification of the single-core droplet, a quad-core structure resembling the cleavage stage of cell division is fabricated (FIG. 11, portion e). Since the viscosity and surface tension of the black photosensitive material (PEGDA+10 wt % iron oxide) are higher than those of the dye, the boundary does not completely contact like the multi-dye cores even if there are four cores at the same time. Meanwhile, a liquid bridge is formed due to the micro-exchange of the materials between the adjacent inner cores after a long time of pressure at the contact point. The four cores are not completely separated but interconnected as one after curing. The phenomenon of being independent of each other before solidification and becoming one after solidification provides an effective research method for biomimetic research on the material exchange between multinuclear structures.

As described previously herein, the systems, methods, and devices disclosed herein can be utilized in various application scenarios. When the droplet is suspended in the air, it not only vibrates in space, but also rotates at an irregular high speed along the longitudinal axis. To visualize the rotation of the droplet, two magnetic droplets are injected into the oil droplet, which rotates inside the droplet edge under the action of centrifugal force. FIG. 4, portion a shows the positions of the dumbbell-shaped structure composed of two cores at different time slots, and the corresponding rotation period lasts 0.4 s. Inspired by the viscous resistance existing at the liquid interface of different flow rates, the magnetic cores can be forced to park at the edge region of the droplet by magnets. At this time, the high-speed flowing droplet receives frictional resistance when flowing through the stationary magnetic core. After a period of time, the droplet stops spinning and the inner core remains stationary. When the magnet is removed, the inner core moves towards the center of the droplet. The droplet continues to rotate, and the inner core is also driven by the flow inside the oil droplet to rotate together. Next, a thin shell structure with a free-moving magnetic core inside is fabricated. The extruded micro-curable PEGDA droplet rests at the tip of the needle under the action of surface tension, which is suspended in the ultrasonic field along with the magnetic helical structure tethered inside the droplet. By precisely controlling the exposure time of UV light, a cell-like structure with a solidified surface while the interior is still liquid and a magnetic core that can move freely is fabricated. As shown in FIG. 4, portion b, the helical magnetic core is driven by the magnet at different positions. To further demonstrate the ability of magnetically driven directional movement, a spherical structure with an offset magnetic core freely and smoothly traverses an ASU-shaped microfluidic channel under the applied magnetic field (FIG. 4, portion c). It can be seen that the smaller magnetic core part at the head always faces the front when moving, which is consistent with the direction of the force. The magnetically driven directional mobile particles demonstrated here can be applied to target drug delivery in complex human blood vessels because the magnetic field has good permeability, the particles themselves do not need to carry energy supply and the driving method is harmless to the human body. In addition, the magnetic cells suspended on the liquid surface reach a balance under the action of buoyancy, gravity, surface tension, and magnetic force (FIG. 4, portion d). When the magnet gradually approaches the glass tank, the increase of the strength of the magnetic field makes the magnetic cells overcome the gravity and surface tension, and gradually move from the central region to the edge. Experimental results have shown that the distance between the magnetic cell and the center of the glass tank is inversely proportional to the distance between the magnet and the magnetic cell.

A contactless suspension of droplets to fabricate mononuclear and multinucleated artificial cellular structures are each disclosed herein. The mechanism of acoustic levitation and the simulations of the acoustic field, droplet morphology and internal convection were demonstrated through these experimental results. In order to fabricate the shell structure, the TBS illumination strategy for non-photosensitive materials, TB illumination strategy for sensitive materials, and TBS+TB illumination strategy for semi-sensitive materials can be utilized according to the light sensitivity of the materials. Correspondingly, the relationship between exposure time and curing thickness was investigated in these experimental results. Moreover, the oil trapping-based manufacturing process exhibits excellent properties for the fabrication of mononuclear or multinucleated cellular structures, which can solidify spheroid structures that are at least 3 times smaller than those cured with direct injection. Finally, the magnetic nuclei stop droplet spin was demonstrated by the experimental results, the ability of magnetic cell structures to move directionally within complex channels driven by the magnet, and the dynamic equilibrium of magnetic cell on the liquid surface under the buoyancy, gravity, surface tension, and magnetic force. Overall, the use of the systems, methods, and devices herein with microfluidics can result in more cost-efficient printing of multi-compartment artificial cells. These experimental results illustrate a new approach to processes such as separation, mixing, and evaporation that occur in the generation of new smart materials and structures. The combination of droplet microfluidics and acoustic manipulation (which are contactless and non-invasive) can combat the challenge of high-order emulsification during the fabrication of artificial cells. The systems, methods, and devices disclose herein can also further exploration of a new manufacturing tool for various applications that are of high value to the biomedical industry.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above-described concepts can be used alone or in combination with any or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible considering the above teaching.

24

What is claimed is:

1. A method for encapsulating a drug comprising:
   suspending a liquid drug droplet containing one or more active ingredients in a sound field;
   injecting a biocompatible solution to surround the liquid drug droplet;
   curing the biocompatible solution to enclose the liquid drug droplet within a cured shell and form the drug;
   applying a liquid layer to the drug; and
   curing the liquid layer to create a multi layered drug or a shelled compartment around the drug.

2. The method of claim 1, wherein curing the biocompatible solution comprises causing at least a portion of the biocompatible solution to harden.

3. The method of claim 1, wherein curing the biocompatible solution comprises curing the biocompatible solution with a light source.

4. The method of claim 1, wherein the cured shell is impermeable.

5. The method of claim 1, wherein curing the biocompatible solution comprises curing a first portion of the biocompatible solution more than a second portion of the biocompatible solution.

6. The method of claim 1, wherein the cured shell dissolves in an acidic environment or an alkali environment.

7. The method of claim 1, wherein a thickness of the cured shell corresponds with a location in an intestinal tract of a patient for release of the liquid drug droplet.

8. The method of claim 1, wherein the biocompatible solution comprises polyethylene glycol diacrylate (PEGDA).

9. The method of claim 1, wherein the sound field is generated using one or more ultrasonic transducers.

10. The method of claim 1, wherein the method is performed in a microgravity or zero-gravity environment.

11. The method of claim 1, wherein the sound field is generated prior to suspending the liquid drug droplet.

12. The method of claim 1, wherein the liquid drug droplet is extruded from a needle.

13. The method of claim 1, wherein the suspending the liquid drug droplet in the sound field comprises dispensing the liquid drug droplet in a low-pressure area of the sound field.

14. The method of claim 3, wherein the light source is configured to emit light having an average wavelength of between 10 nm and 400 nm.

15. The method of claim 3, wherein curing the biocompatible solution with a light source comprises using at least one of: a top-bottom (TB) illumination strategy, a top-bottom-side (TBS) illumination strategy, or a combined TB and TBS illumination strategy.

16. The method of claim 9, wherein the one or more ultrasonic transducers comprise a first set of ultrasonic transducers spaced apart from a second set of ultrasonic transducers.

17. The method of claim 16, wherein the first set of ultrasonic transducers are arranged in three concentric circles.

18. The method of claim 17, wherein the first set of ultrasonic transducers and the second set of ultrasonic transducers are positioned opposite to one another to create standing waves therebetween.

19. The method of claim 1, further comprising injecting, into the liquid drug droplet, a magnetic material.

* * * * *